US011995394B1

(12) United States Patent
Morariu et al.

(10) Patent No.: US 11,995,394 B1
(45) Date of Patent: May 28, 2024

(54) LANGUAGE-GUIDED DOCUMENT EDITING

(71) Applicant: ADOBE INC., San Jose, CA (US)

(72) Inventors: Vlad Ion Morariu, Potomac, MD (US); Puneet Mathur, College Park, MD (US); Rajiv Bhawanji Jain, Falls Church, VA (US); Jiuxiang Gu, Baltimore, MD (US); Franck Dernoncourt, Spokane, WA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 18/165,579

(22) Filed: Feb. 7, 2023

(51) Int. Cl.
| | |
|---|---|
| *G06F 40/166* | (2020.01) |
| *G06F 3/16* | (2006.01) |
| *G06F 40/284* | (2020.01) |
| *G06N 20/00* | (2019.01) |
| *G10L 15/22* | (2006.01) |
| *G10L 15/26* | (2006.01) |

(52) U.S. Cl.
CPC .......... *G06F 40/166* (2020.01); *G06F 3/167* (2013.01); *G06F 40/284* (2020.01); *G06N 20/00* (2019.01); *G10L 15/22* (2013.01); *G10L 15/26* (2013.01)

(58) Field of Classification Search
CPC ......... G10L 15/22; G10L 15/26; G06F 3/167; G06F 40/166; G06N 20/00
See application file for complete search history.

(56) References Cited

U.S. PATENT DOCUMENTS

| | | | | |
|---|---|---|---|---|
| 11,488,597 | B2 * | 11/2022 | Carbune | G10L 25/54 |
| 2015/0193200 | A1 * | 7/2015 | Zeng | G06F 3/167 |
| | | | | 704/275 |
| 2017/0263248 | A1 * | 9/2017 | Gruber | G06F 40/166 |
| 2018/0018308 | A1 * | 1/2018 | Zuo | G06F 40/247 |
| 2020/0320164 | A1 * | 10/2020 | Botea | G06F 40/197 |
| 2021/0090571 | A1 * | 3/2021 | Yang | G10L 15/08 |
| 2022/0035596 | A1 * | 2/2022 | Hu | G06F 40/40 |
| 2022/0076668 | A1 * | 3/2022 | Carbune | G10L 15/063 |
| 2022/0138185 | A1 * | 5/2022 | Tran | G06F 40/56 |
| | | | | 706/18 |
| 2022/0284904 | A1 * | 9/2022 | Pu | G06F 40/35 |

(Continued)

FOREIGN PATENT DOCUMENTS

| | | | |
|---|---|---|---|
| WO | WO-2021244099 A1 * | 12/2021 | |
| WO | WO-2022187480 A1 * | 9/2022 | G06F 3/017 |

OTHER PUBLICATIONS

Bao, et al, "BEiT: BERT Pre-Training of Image Transformers", arXiv preprint: arXiv:2106.08254v2 [cs.CV] Sep. 3, 2022, 18 pages.

(Continued)

*Primary Examiner* — Asher D Kells
(74) *Attorney, Agent, or Firm* — F. CHAU & ASSOCIATES, LLC

(57) ABSTRACT

Systems and methods for document editing are provided. One aspect of the systems and methods includes obtaining a document and a natural language edit request. Another aspect of the systems and methods includes generating a structured edit command using a machine learning model based on the document and the natural language edit request. Yet another aspect of the systems and methods includes generating a modified document based on the document and the structured edit command, where the modified document includes a revision of the document that incorporates the natural language edit request.

19 Claims, 11 Drawing Sheets

(56) References Cited

U.S. PATENT DOCUMENTS

| | | | | |
|---|---|---|---|---|
| 2023/0042221 | A1* | 2/2023 | Xu | G06N 3/084 |
| 2023/0049562 | A1* | 2/2023 | Carbune | G10L 25/54 |
| 2023/0084977 | A1* | 3/2023 | Pallakoff | G06F 3/0481 |
| | | | | 715/271 |
| 2023/0123430 | A1* | 4/2023 | Dolan | G06F 9/451 |
| | | | | 706/12 |
| 2023/0205980 | A1* | 6/2023 | Brockett | G06F 40/151 |
| | | | | 715/229 |
| 2023/0267931 | A1* | 8/2023 | Soni | G06F 3/167 |
| | | | | 704/251 |
| 2023/0274098 | A1* | 8/2023 | Syeda-Mahmood | G06F 40/30 |
| | | | | 704/9 |

OTHER PUBLICATIONS

Carion, et al, "End-to-End Object Detection with Transformers", in European conference on computer vision, pp. 213-229, Springer, arXiv preprint: arXiv:2005.12872v3 [cs.CV] May 28, 2020, 26 pages.

Chen, et al, "Language-Based Image Editing with Recurrent Attentive Models", in Proceedings of the IEEE Conference on Computer Vision and Pattern Recognition, pp. 8721-8729, arXiv preprint: arXiv:1711.06288v2 [cs.CV] Jun. 10, 2018, 12 pages.

Chen, et al, "Real-Time Referring Expression Comprehension by Single-Stage Grounding Network", arXiv preprint: arXiv:1812.03426v1 [cs.CV] Dec. 9, 2018, 16 pages.

Deng, et al, "TransVG++: End-to-End Visual Grounding with Language Conditioned Vision Transformer", arXiv preprint: arXiv:2206.06619v1 [cs.CV] Jun. 14, 2022, 16 pages.

Devlin, et al, "BERT: Pre-training of Deep Bidirectional Transformers for Language Understanding", arXiv preprint: arXiv:1810.04805v2 [cs.CL] May 24, 2019, 16 pages.

Hu, et al, "Iterative Answer Prediction with Pointer-Augmented Multimodal Transformers for TextVQA", in Proceedings of the IEEE/CVF Conference on Computer Vision and Pattern Recognition, pp. 9992-10002, arXiv preprint: arXiv:1911.06258v3 [cs.CV] Mar. 24, 2020, 15 pages.

Kim, et al, "CAISE: Conversational Agent for Image Search and Editing", in AAAI, arXiv preprint: arXiv:2202.11847v1 [cs.CL] Feb. 24, 2022, 11 pages.

Lewis, et al, "BART: Denoising Sequence-to-Sequence Pre-training for Natural Language Generation, Translation, and Comprehension", in ACL, arXiv preprint: arXiv:1910.13461v1 [cs.CL] Oct. 29, 2019, 10 pages.

Li, et al, "DiT: Self-supervised Pre-training for Document Image Transformer", ACM Multimedia, arXiv preprint: arXiv:2203.02378v3 [cs.CV] Jul. 19, 2022, 10 pages.

Lin, et al, "A Multimodal Dialogue System for Conversational Image Editing", arXiv preprint: arXiv:2002.06484v1 [cs.CL] Feb. 16, 2020, 10 pages.

Manuvinakurike, et al, "DialEdit: Annotations for Spoken Conversational Image Editing", in Proceedings 14th Joint ACL-ISO Workshop on Interoperable Semantic Annotation, pp. 1-9.

Manuvinakurike, et al, "Edit me: A Corpus and a Framework for Understanding Natural Language Image Editing", in LREC, pp. 4322-4326.

Manuvinakurike, et al, "Conversational Image Editing: Incremental Intent Identification in a New Dialogue Task", in SIGDIAL Conference, pp. 284-295.

Mokady, et al, "ClipCap: CLIP Prefix for Image Captioning", arXiv preprint: arXiv:2111.09734v1 [cs.CV] Nov. 18, 2021, 10 pages.

Plummer, et al., "Conditional Image-Text Embedding Networks", arXiv preprint: arXiv:1711.08389v4 [cs.CV] Jul. 28, 2018, 16 pages.

Radford, et al, "Language Models are Unsupervised Multitask Learners", OpenAI blog, 1(8): 9, 24 pages.

Raffel, et al, "Exploring the Limits of Transfer Learning with a Unified Text-to-Text Transformer", J. Mach. Learn. Res., 21(140): pp. 1-67, arXiv preprint: arXiv:1910.10683v3 [cs.LG] Jul. 28, 2020, 67 pages.

Rothe, et al, "Leveraging Pre-trained Checkpoints for Sequence Generation Tasks", Transactions of the Association for Computational Linguistics, 8: pp. 264-280, arXiv preprint: arXiv:1907.12461v2 [cs.CL] Apr. 16, 2020, 17 pages.

Sadhu, et al, "Zero-Shot Grounding of Objects From Natural Language Queries", 2019 IEEE/CVF International Conference on Computer Vision (ICCV), pp. 4693-4702, arXiv preprint: disarXiv:1908.07129v1 [cs.CV] Aug. 20, 2019, 13 pages.

Shi, et al, "Learning by Planning: Language-Guided Global Image Editing", in Proceedings of the IEEE/CVF Conference on Computer Vision and Pattern Recognition, pp. 13590-13599, arXiv preprint: arXiv:2106.13156v1 [cs.CV] Jun. 24, 2021, 19 pages.

Shi, et al, "SpaceEdit: Learning a Unified Editing Space for Open-Domain Image Color Editing", in Proceedings of the IEEE/CVF Conference on Computer Vision and Pattern Recognition, pp. 19730-19739, arXiv preprint: arXiv:2112.00180v1 [cs.CV] Nov. 30, 2021, 20 pages.

Yang, et al, "Improving One-stage Visual Grounding by Recursive Sub-query Construction", arXiv preprint: arXiv:2008.01059v1 [cs.CV] Aug. 3, 2020, 21 pages.

Yang, et al, "A Fast and Accurate One-Stage Approach to Visual Grounding", 2019 IEEE/CVF International Conference on Computer Vision (ICCV), pp. 4682-4692, arXiv preprint: arXiv:1908.06354v1 [cs.CV] Aug. 18, 2019, 13 pages.

Yu, et al, "Rethinking Diversified and Discriminative Proposal Generation for Visual Grounding", in IJCAI, arXiv preprint: arXiv:1805.03508v1 [cs.CV] May 9, 2018, 8 pages.

* cited by examiner

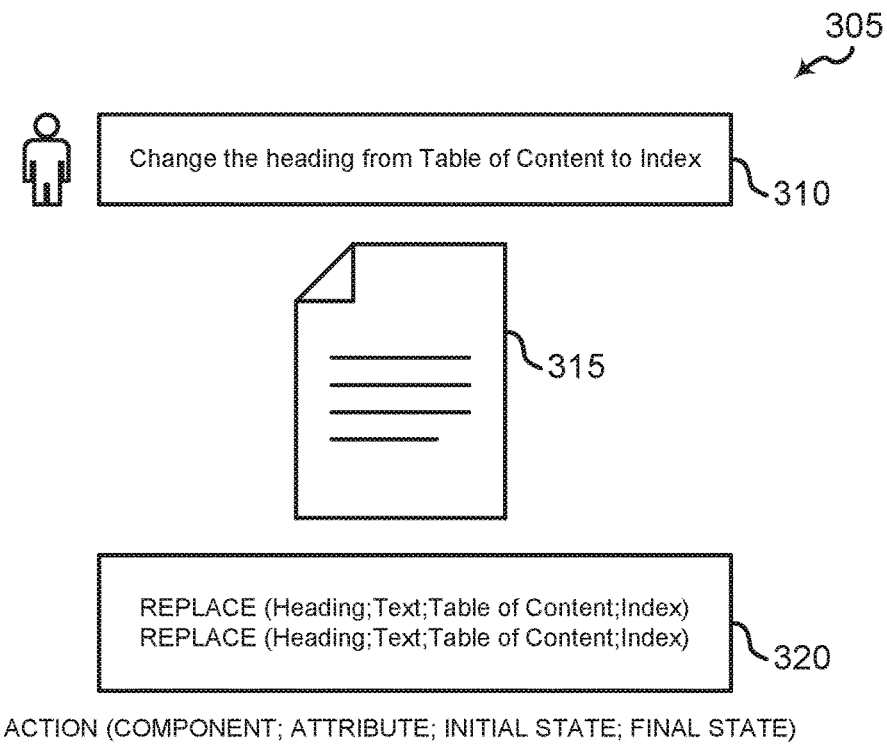
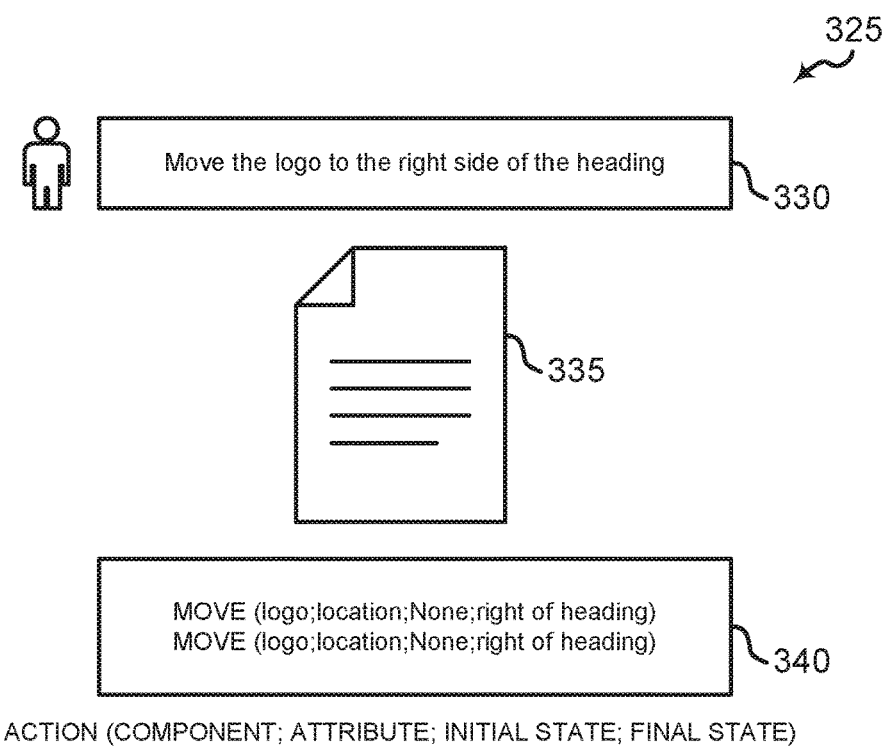
FIG. 3

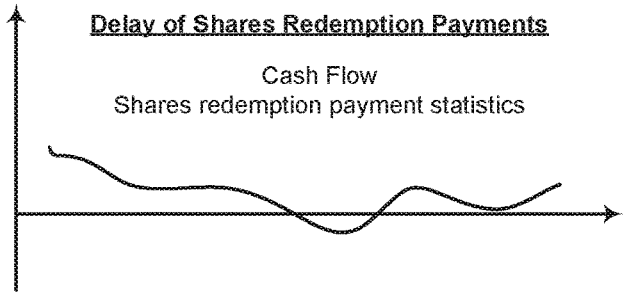

Shift the subheading "Cash Flow" and the sentence below it 10px below the x-axis of the graph

Delay of Shares Redemption Payments

Cash Flow
Shares redemption payment statistics

ACTION (COMPONENT; ATTRIBUTE; INITIAL STATE; FINAL STATE)
Move (Text; Location; None; +10px Down x-axis)

905

Check options SPO/DCA and Fund Dividend in leftmost column Transaction

| Transaction | From Account | Amount |
|---|---|---|
| ○ SPO/DCA | ⎯⎯ | ⎯⎯ |
| ○ Fund Dividend | ⎯⎯ | ⎯⎯ |
| ○ ⎯⎯ | ⎯⎯ | ⎯⎯ |
| ○ ⎯⎯ | ⎯⎯ | ⎯⎯ |
| ○ ⎯⎯ | ⎯⎯ | ⎯⎯ |

ACTION (COMPONENT; ATTRIBUTE; INITIAL STATE; FINAL STATE)
Modify (Checkbox; SPO/DCA; Fund Dividend; Unticked; Tick)

910

Change the yellow heart above the text to a red circle

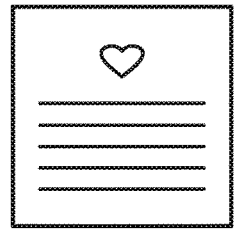

ACTION (COMPONENT; ATTRIBUTE; INITIAL STATE; FINAL STATE)
Replace (Image; Shape; Color; heart, yellow; circle, red)

LANGUAGE-GUIDED DOCUMENT EDITING

BACKGROUND

The following relates generally to machine learning, and more specifically to machine learning for document editing.

Digital document management may improve business productivity (e.g., drafting contract agreements, presentations decks, letterheads, invoices, resumes, form filling, etc.). Digital documents may also be used to communicate through online advertisements, social media posts, flyers, posters, billboards, web and mobile application prototypes, etc. Digital document editing (or document editing) may refer to the process of making changes to a digital document using a computer or other electronic device. This may include adding, deleting, or modifying text, images, and other content in a document. Various applications or tools may support different functionalities for editing documents, and these tools may be used by skilled professionals to perform a wide range of edits to a document.

SUMMARY

The present disclosure describes systems and methods for document editing. Embodiments of the present disclosure include a document editing apparatus configured to modify a document based on a natural language edit request from a user. The document editing apparatus may include a machine learning model that takes a document and a natural language edit request as inputs, and the machine learning model may generate a structured edit command based on the document and the natural language edit request. The machine learning model may also identify a location of the portion of the document to be edited such that the portion of the document may be edited based on the structured edit command.

A method, apparatus, non-transitory computer readable medium, and system for machine learning for document editing are described. One or more aspects of the method, apparatus, non-transitory computer readable medium, and system include obtaining a document and a natural language edit request; generating a structured edit command using a machine learning model based on the document and the natural language edit request; and generating a modified document based on the document and the structured edit command, wherein the modified document comprises a revision of the document that incorporates the natural language edit request.

A method, apparatus, non-transitory computer readable medium, and system for machine learning for document editing are described. One or more aspects of the method, apparatus, non-transitory computer readable medium, and system include initializing parameters for a machine learning model; obtaining training data including a document and a training prompt; generating a structured edit command and location information for a text object using a machine learning model based on the document and the training prompt; computing a multitask loss function based at least in part on the structured edit command and the location information; and training the machine learning model by updating the parameters based on the multitask loss function.

An apparatus, system, and method for machine learning for document editing are described. One or more aspects of the apparatus, system, and method include a memory component; a processing device coupled to the memory component, the processing device to perform operations comprising: obtaining a document and a natural language edit request; generating a structured edit command using a machine learning model based on the document and the natural language edit request; and generating a modified document based on the document and the structured edit command, wherein the modified document comprises a revision of the document that incorporates the natural language edit request.

BRIEF DESCRIPTION OF THE DRAWINGS

FIG. 3 shows examples of structured edit commands generated by a document editing apparatus according to aspects of the present disclosure.

FIG. 9 shows an example of training data for training a document editing apparatus according to aspects of the present disclosure.

DETAILED DESCRIPTION

Figure 1:
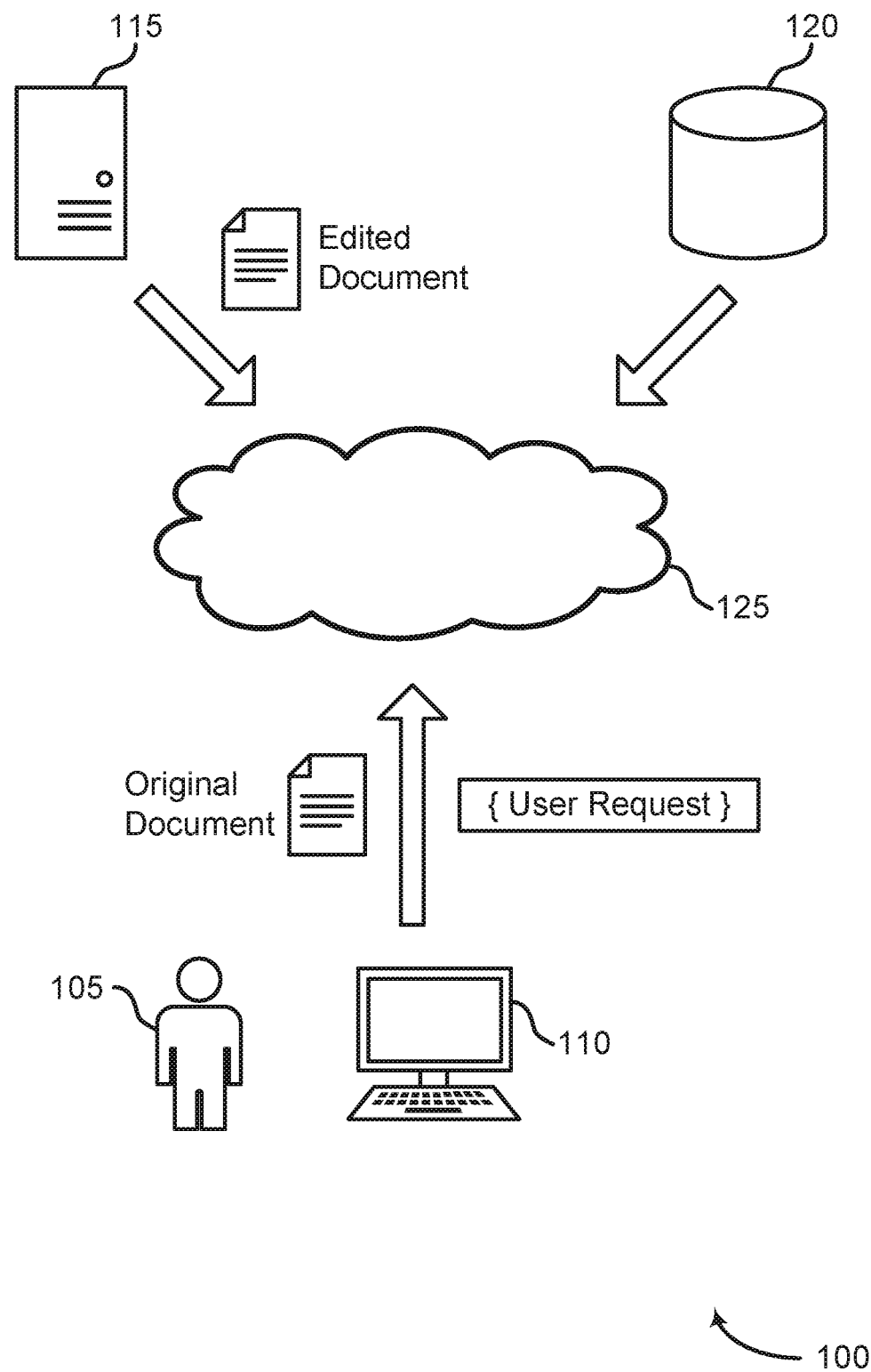
FIG. 1 shows an example of a document editing system according to aspects of the present disclosure.

The present disclosure describes systems and methods for document editing. Embodiments of the present disclosure include a document editing apparatus configured to modify a document based on a natural language edit request from a user. The document editing apparatus may include a machine learning model that takes a document and a natural language edit request as inputs, and the machine learning model may generate a structured edit command based on the document and the natural language edit request. The machine learning model may also identify a location of the portion of the document to be edited such that the portion of the document may be edited based on the structured edit command.

Document editing may refer to the process of making changes to a digital document using a computer or other electronic device. This may include adding, deleting, or modifying text, images, and other content in a document. Various applications or tools may support different functionalities for editing documents, and these tools may be used to perform a wide range of edits to a document. In some cases, a user of a professional document editing tool may be expected to have a certain level of expertise to perform complex edit operations. To make editing tools accessible to increasingly novice users, an intelligent document assistant system may be configured to make or suggest edits to a user based on a natural language request from the user. Such a system can understand a user's ambiguous request and contextualize the request to the visual cues and textual content found in a document. The system may then edit localized unstructured text and structured layouts in the document based on the understanding.

The present disclosure describes systems and methods for performing language-guided localized document editing tasks. In some cases, an editing task refers to a document edit based on a user providing a document and an open vocabulary editing request. A document editing apparatus may produce a command for an editing task that can be used to automate edits in real-world document editing software. Embodiments of the present disclosure include the curation of a dataset for training a document editing apparatus. In some examples, the dataset may include a collection of instances of user edit requests (e.g., 28.3 thousand instances) over Portable Document Format (PDF) and design templates along with corresponding ground truth software executable commands. The dataset provides a mix of edit operations with direct and indirect references to embedded text and visual objects such as paragraphs, lists, tables, etc.

Embodiments of the present disclosure further include the document editing apparatus that performs language-guided document editing. The document editing apparatus may be a transformer-based localization-aware multimodal model that performs editing tasks. The model may be multimodal since it may receive and process different modes of input (e.g., textual, spatial, or visual input) and it may generate different modes of output (e.g., textual, spatial, or visual output). The document editing apparatus may receive inputs specifying document objects (e.g., paragraphs, images) and related text contents (i.e., a user edit request). The document editing apparatus may then generate a multimodal embedding that is used to predict an edit command and associated bounding box for localization of a portion of a document to be edited.

Because the document editing apparatus may be capable of predicting an edit command based on a natural language edit request, the document editing apparatus may be accessible to and usable by novice users. That is, novice users may simply provide a natural language edit request to edit a document, rather than attempting to learn and use a professional document editing tool to perform complex edit operations. Thus, the document editing apparatus may be easy to use while still supporting complex edit operations. Details regarding the architecture of an example document editing apparatus are provided with reference to FIGS. 1-5. Details regarding the process of document editing are provided with reference to FIGS. 6-8. Example training processes are described with reference to FIGS. 9 and 10.

Network Architecture

FIG. 1 shows an example of a document editing system according to aspects of the present disclosure. The example shown includes user 105, user device 110, document editing apparatus 115, database 120, and cloud 125. A user 105 may interact with document editing software on user device 110. The user device 110 may communicate with a document editing apparatus 115, which may be located on the cloud 125. For instance, the user device 110 may provide an original document (e.g., document image) and a natural language editing request to the document editing apparatus 115. The document editing apparatus 115 may generate a structured edit command using a machine learning model based on the original document and the natural language edit request. The document editing apparatus 115 may then generate a modified document based on the original document and the structured edit command.

In some examples, the document editing apparatus 115 may include a server. A server provides one or more functions to users 105 linked by way of one or more of the various networks. In some cases, the server includes a single microprocessor board, which includes a microprocessor responsible for controlling all aspects of the server. In some cases, a server uses microprocessor and protocols to exchange data with other devices/users 105 on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing user device 110, a personal computer, a laptop computer, a mainframe computer, a supercomputer, or any other suitable processing apparatus.

A database 120 is an organized collection of data. For example, a database 120 stores data in a specified format known as a schema. A database 120 may be structured as a single database 120, a distributed database 120, multiple distributed databases 120, or an emergency backup database 120. In some cases, a database 120 controller may manage data storage and processing in a database 120. In some cases, a user 105 interacts with database 120 controller. In other cases, database 120 controller may operate automatically without user 105 interaction.

A cloud 125 is a computer network configured to provide on-demand availability of computer system resources, such as data storage and computing power. In some examples, the cloud 125 provides resources without active management by the user 105. The term cloud is sometimes used to describe data centers available to many users over the Internet. Some large cloud 125 networks have functions distributed over multiple locations from central servers. A server is designated an edge server if it has a direct or close connection to a user 105. In some cases, a cloud 125 is limited to a single organization. In other examples, the cloud 125 is available to many organizations. In one example, a cloud 125 includes a multi-layer communications network comprising multiple edge routers and core routers. In another example, a cloud 125 is based on a local collection of switches in a single physical location.

A user device 110 is a personal computer, laptop computer, mainframe computer, palmtop computer, personal assistant, mobile device, or any other suitable processing apparatus.

Digital documents may help to improve business productivity (e.g., drafting contract agreements, presentations decks, letterheads, invoices, resumes, form filling, etc.). Digital documents may also be used to communicate with customers through online advertisements, social media posts, flyers, posters, billboards, web and mobile app prototypes, etc. However, some document editing tools may be challenging to use and the target users of these editing tools may be skilled professionals (e.g., working on a large screen). For instance, to perform some editing operations on these editing tools, a user may configure multiple different functionalities of the editing tools for text and image region placement, grouping, spatial alignment, replacement, resizing, splitting, merging, and special effects. As the demand from novice users for creating and editing documents (e.g., on mobile devices) increases, it may be appropriate to provide more accessible document editing tools. In some examples, document editing tools may be made more accessible through an intelligent assistant system that can decipher a user's intent from an editing request and translate the editing request into executable code that can be processed by the editing tool to fulfill the editing request.

Embodiments of the present disclosure include formulation of a task for language guided document editing and creation of a dataset for training a document editing apparatus. In some cases, the dataset (e.g., DocEdit) may include executable commands (e.g., move components, modify attribute values and special effects, add/delete text, etc.) and visually grounded regions of interest in a document given a natural language edit request expressed by a user over a document. Thus, a document editing system may understand user intent and may extract and interpret the textual content of documents and visual cues including layout (e.g., paragraphs, lists, tables, headers, footers), non-textual elements (e.g., marks, tick, shapes, diagrams, graphs), and style (i.e., font, colors, size, highlighting, special effects).

The dataset for training a document editing apparatus may incorporate visual cues and a high-density of textual tokens by considering relative positioning of objects and text tokens. The dataset may provide natural language edit requests on PDFs and design template documents, and the dataset may provide the results of a human performing the edit requests. Each edit request is mapped to an executable command that can be simulated in a real-world document editing software. To collect the dataset, user interface (UI) experts may edit a set of input documents and provide a description of the edit. The UI experts may also generate the ground truth executable command corresponding to a set of diverse and creative edit requests posed by freelance designers. In some examples, the dataset may contain 17.8 k PDF and 10.5 k design templates with a diverse mix of edit operations (add, delete, modify, split, merge, replace, move, copy, etc.) and reference types (direct, object referring, text referring, etc.) from the users.

In some cases, a model (e.g., DocEditor model) may automate language-guided localized document editing (LLDE). The model represents the visual appearance of document elements (e.g., paragraphs, images) through corresponding bounding boxes. The model also represents document semantics (e.g., the meaning of the text in the document) through document text tokens obtained via optical character recognition (OCR). The model uses multi-head attention to obtain a text-enriched visual box embedding which is fused with a text embedding and a regression token. The fused representation is provided to a transformer decoder, which generates the command text in an autoregressive fashion. Additionally, a layout graph encodes the relative position of boxes and document text tokens to regress the region of interest (RoI) bounding box coordinates. In some cases, node classification is performed as an auxiliary task for anchor box prediction to ground the edit location in terms of relevant object and document text token boxes. In some cases, DocEditor outperforms other unimodal and multimodal baselines for the node classification task.

The present disclosure describes systems and methods to generate a task and dataset for document edit command generation for language-guided localized document editing. For example, the dataset consists of more than 28.3K document-edit pairs on PDFs (17.8K), design templates (10.5K), and corresponding ground truth executable commands to simulate real-world editing. Embodiments of the present disclosure include a multimodal transformer that produces a spatially localized set of edit commands for a language-based edit request. In some cases, the multimodal language-guided document editing model (e.g., DocEditor) understands document text and can perform localized edits.

In some examples, the model may empirically outperform existing baseline deep learning approaches by 15-18%.

Figure 2:
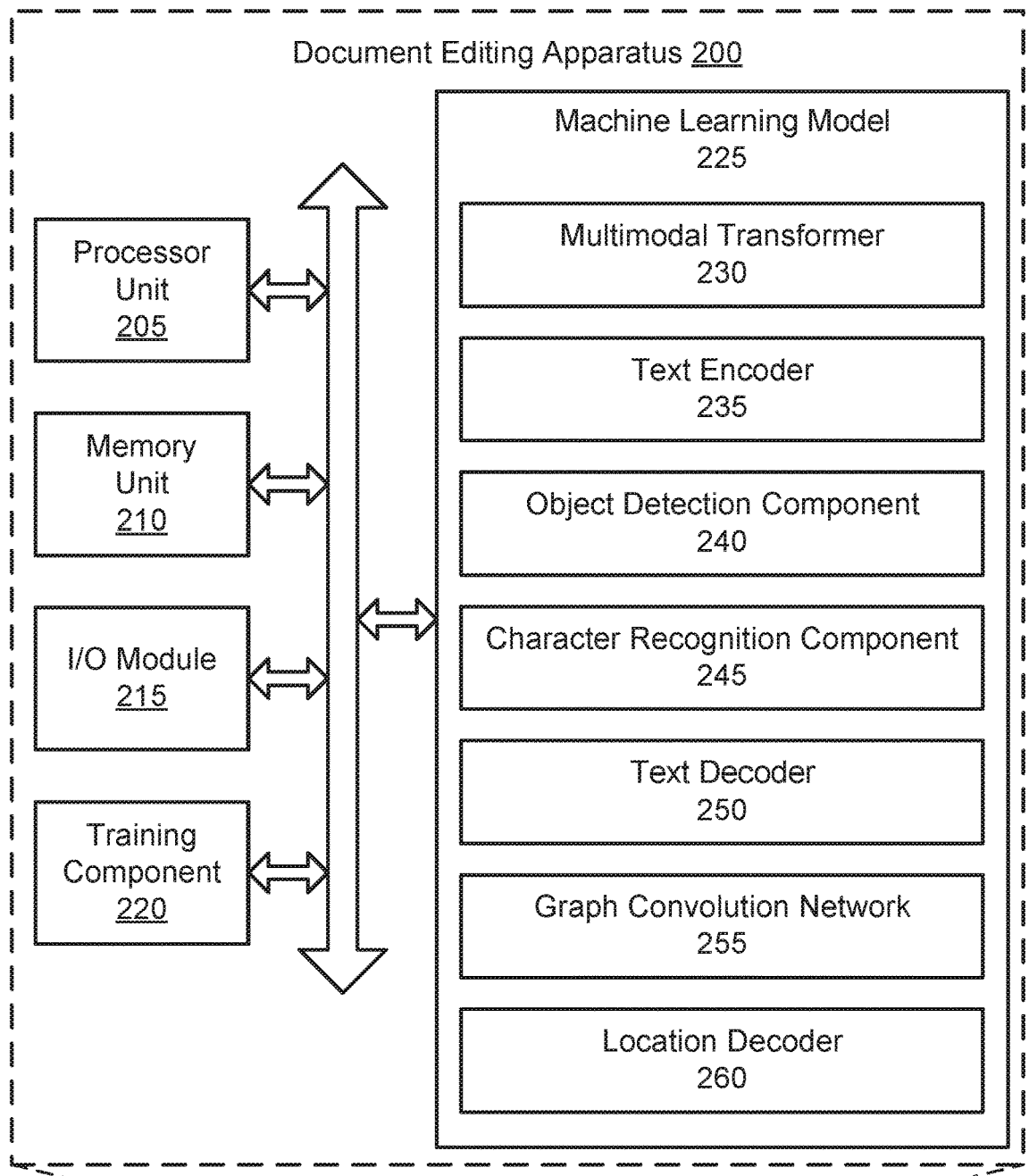
FIG. 2 shows an example of a document editing apparatus according to aspects of the present disclosure.

FIG. 2 shows an example of a document editing apparatus 200 according to aspects of the present disclosure. The example shown includes document editing apparatus 200, processor unit 205, memory unit 210, I/O module 215, training component 220, machine learning model 225, multimodal transformer 230, text encoder 235, object detection component 240, character recognition component 245, text decoder 250, graph convolution network 255, and location decoder 260. Document editing apparatus 200 is an example of, or includes aspects of, the corresponding element described with reference to FIG. 1.

Processor unit 205 comprise a processor. Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 205 is configured to operate a memory array using a memory controller. In other cases, a memory controller is integrated into the processor unit 205. In some cases, the processor unit 205 is configured to execute computer-readable instructions stored in a memory to perform various functions. In some embodiments, a processor unit 205 includes special purpose components for modem processing, baseband processing, digital signal processing, or transmission processing.

Memory unit 210 comprise a memory including instructions executable by the processor. Examples of a memory unit 210 include random access memory (RAM), read-only memory (ROM), or a hard disk. Examples of memory units 210 include solid state memory and a hard disk drive. In some examples, memory is used to store computer-readable, computer-executable software including instructions that, when executed, cause a processor to perform various functions described herein. In some cases, the memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 215 includes a user interface. A user interface may enable a user to interact with a device. In some embodiments, the user interface may include an audio device, such as an external speaker system, an external display device such as a display screen, or an input device (e.g., remote-control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments, document editing apparatus 200 includes a computer-implemented artificial neural network (ANN) to generate classification data for a set of samples. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, document editing apparatus 200 graph convolutional network (GCN). A GCN is a type of neural network that defines convolutional operation on graphs and uses their structural information. For example, a GCN may be used for node classification (e.g., documents) in a graph (e.g., a citation network), where labels are available for a subset of nodes using a semi-supervised learning approach. A feature description for every node is summarized in a matrix and uses a form of pooling operation to produce a node level output. In some cases, GCNs use dependency trees which enrich representation vectors for aspect terms and search for sentiment polarity of an input phrase/sentence.

According to some embodiments, document editing apparatus 200 includes a transformer. A transformer or transformer network is a type of neural network model used for natural language processing tasks. A transformer network transforms one sequence into another sequence using an encoder and a decoder. The encoder and decoder include modules that can be stacked on top of each other multiple times. The modules comprise multi-head attention and feed forward layers. The inputs and outputs (e.g., target sentences) are first embedded into an n-dimensional space. Positional encoding of the different words (i.e., give every word/part in a sequence a relative position since the sequence depends on the order of its elements) are added to the embedded representation (n-dimensional vector) of each word.

In some examples, a transformer network includes attention mechanism, where the attention looks at an input sequence and decides at each step which other parts of the sequence are important. The attention mechanism involves query, keys, and values denoted by Q, K, and V, respectively. Q is a matrix that contains the query (vector representation of one word in the sequence), K are all the keys (vector representations of all the words in the sequence) and V are the values, which are again the vector representations of all the words in the sequence. For the encoder and decoder, multi-head attention modules, V consists of the same word sequence than Q. However, for the attention module that is taking into account the encoder and the decoder sequences, V is different from the sequence represented by Q. In some cases, values in V are multiplied and summed with some attention-weights a.

According to some aspects, machine learning model 225 obtains a document and a natural language edit request. In some examples, machine learning model 225 generates a structured edit command based on the document and the natural language edit request. According to some aspects, document editing apparatus 200 generates a modified document based on the document and the structured edit command, where the modified document includes a revision of the document that incorporates the natural language edit request.

According to some aspects, text encoder 235 encodes the natural language edit request to obtain a request embedding, where the structured edit command is generated based on the request embedding.

According to some aspects, object detection component 240 performs object detection on the document to obtain a text object. According to some aspects, character recognition component 245 performs text recognition on the document to obtain a text embedding. In some examples, machine learning model 225 combines the text object with the text embedding to obtain a text-enriched object, where the structured edit command is generated based on the text-enriched object.

In some examples, machine learning model 225 identifies an object position for the text object. In some examples, machine learning model 225 identifies a text position of the text embedding, where the text object with the text embedding are combined based on the object position and the text position.

According to some aspects, multimodal transformer 230 generates a hidden text representation using the machine learning model 225. According to some aspects, text decoder 250 decodes the hidden text representation to obtain the structured edit command.

In some aspects, the structured edit command includes an action, a target component, an attribute, an initial state, and a final state.

In some examples, multimodal transformer 230 generates a hidden object representation of a text object. According to some aspects, graph convolution network 255 generates a layout graph based on the document. According to some aspects, location decoder 260 generates a modified object representation based on the hidden object representation and the layout graph. In some examples, location decoder 260 generates location information of the text object based on the modified object representation, where the modified document is generated based on the location information of the text object.

In some aspects, the location information includes a bounding box for the text object.

In some examples, machine learning model 225 generates a regression (REG) token. In some examples, machine learning model 225 generates an REG representation based on the REG token using the machine learning model 225, where the location information is generated based on the REG representation.

In some examples, document editing apparatus 200 generates a document image based on the document, where the document image does not include parsed text data, and where the structured edit command and the modified document are generated based on the document image.

According to some aspects, training component 220 initializes parameters for a machine learning model 225. In some examples, training component 220 obtains training data including a document and a training prompt. According to some aspects, machine learning model 225 generates a structured edit command and location information for a text object using a machine learning model 225 based on the document and the training prompt. In some examples, training component 220 computes a multitask loss function based on the structured edit command and the location information. In some examples, training component 220 trains the machine learning model 225 by updating the parameters based on the multitask loss function.

In some examples, training component 220 computes a command generation loss based on the structured edit command, where the multitask loss function includes the command generation loss. In some examples, training component 220 computes a bounding box regression loss based on the location information, where the multitask loss function includes the bounding box regression loss. In some examples, training component 220 computes a location prediction loss that indicates whether the location information lies within a ground truth region of interest (RoI), where the multitask loss function includes the location prediction loss.

FIG. 3 shows examples of structured edit commands 300 generated by a document editing apparatus according to aspects of the present disclosure. The document editing apparatus may generate each structured edit command based on a document and a natural language edit request. The document editing apparatus may effectively localize objects mentioned in the natural language edit request (e.g., descriptions) and match them to relevant document text. In an example 305, the document editing apparatus may generate a structured edit command 320 based on a natural language edit request 310 and a document 315. In an example 325, the document editing apparatus may generate a structured edit command 340 based on a natural language edit request 330 and a document 335.

Figure 4:
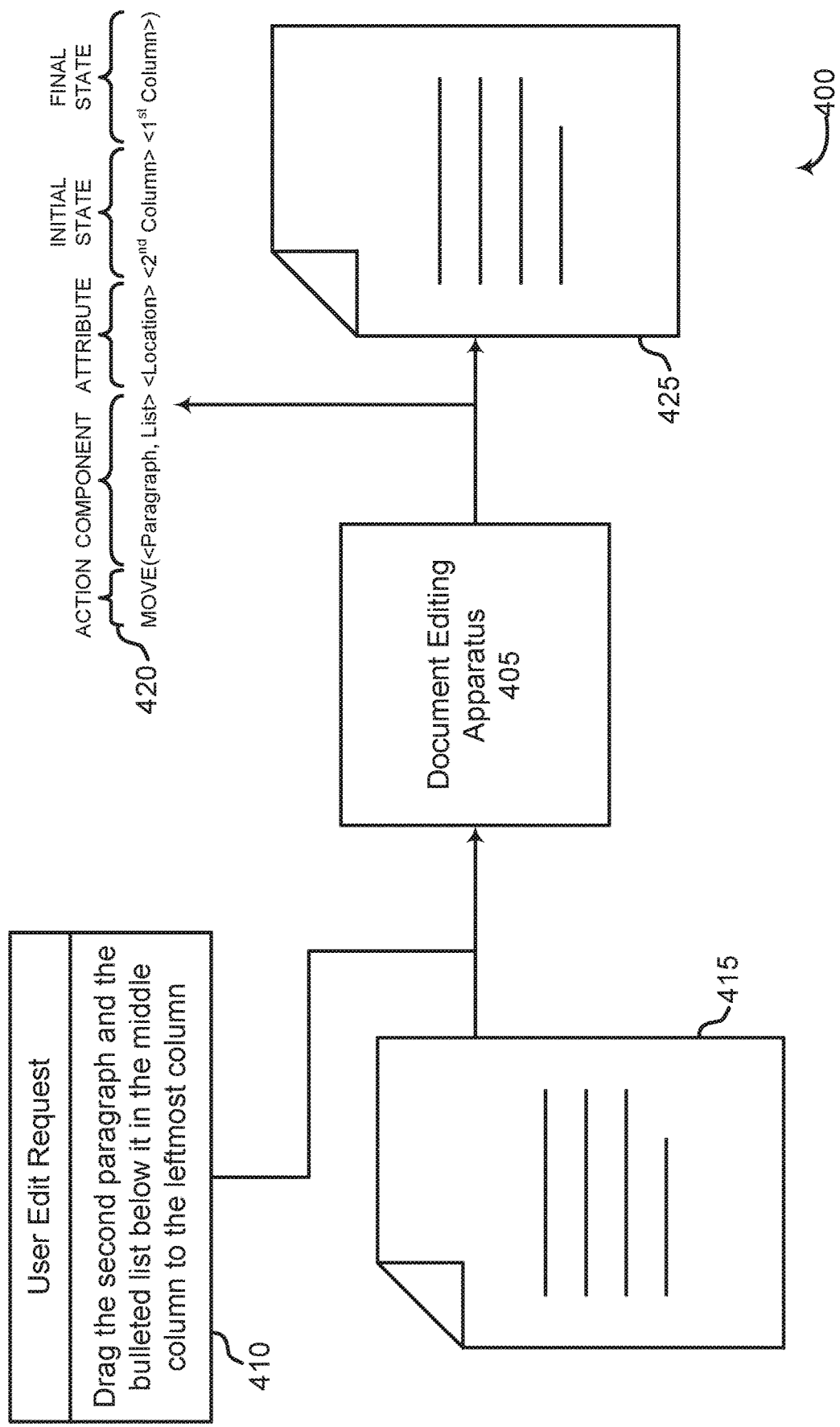
FIG. 4 shows an example of a document editing system according to aspects of the present disclosure.

FIG. 4 shows an example of a document editing system 400 according to aspects of the present disclosure. The document editing system 400 may include a document editing apparatus 405 (e.g., DocEditor). The document editing apparatus 405 may be a neural architecture that takes a user editing request 410 and a document 415 as input and predicts an executable edit command 420. In some examples, the document 415 may refer to a document image generated by the document editing system 400 (e.g., based on a document provided by a user), or the document may refer to a document image provided by a user. In some cases, the prediction is based on generating textual functional arguments and regressing bounding box coordinates of an edit RoI. The document editing apparatus 405 may sequentially perform multimodal feature extraction to obtain a user request embedding, visual object embeddings, and document text token embeddings. The document editing apparatus 405 may also obtain text-enriched visual object representations. Next, the document editing apparatus 405 may generate an executable command 420 by combining the linguistic and visual input representations and passing the combination through a transformer encoder-decoder. A layout graph for encoding spatial relationships and RoI bounding box regression of a command's target region are provided after generating the executable command. The document editing apparatus 405 may execute the executable command 420 (e.g., an edit command) based on the edit RoI to generate a modified document 425.

In some cases, the executable command 420 is generated from a linguistic user editing request 410 for editing a document according to a user's intent. Formally, given a document D to be edited and the user editing request 410 defined as a sequence of n tokens $W=[t_1, t_2, \ldots t_l]$, the document editing apparatus 405 may predict the executable command C of the format: ACTION(<Component>, <Attribute>, <Initial_State>, <Final_State>, [x, y, h, w]). Here, ACTION describes the executable function belonging to the following taxonomy—add, delete, copy, move, replace, split, merge, modify. The taxonomy is followed by arguments corresponding to the document components to be edited, attributes to be modified, initial state of the attributes, and the final state of the attributes expected in the edited version. The RoI (e.g., specifying a region to be edited) is represented by the bounding box [x, y, h, w] enclosing the components to be edited in the input document, such that (x, y) refers to the top-left coordinate while h and w refer to the height and width of the bounding box, respectively. The document editing apparatus 405 may perform an end-to-end command generation task and RoI bounding box regression grounded in a document.

Figure 5:
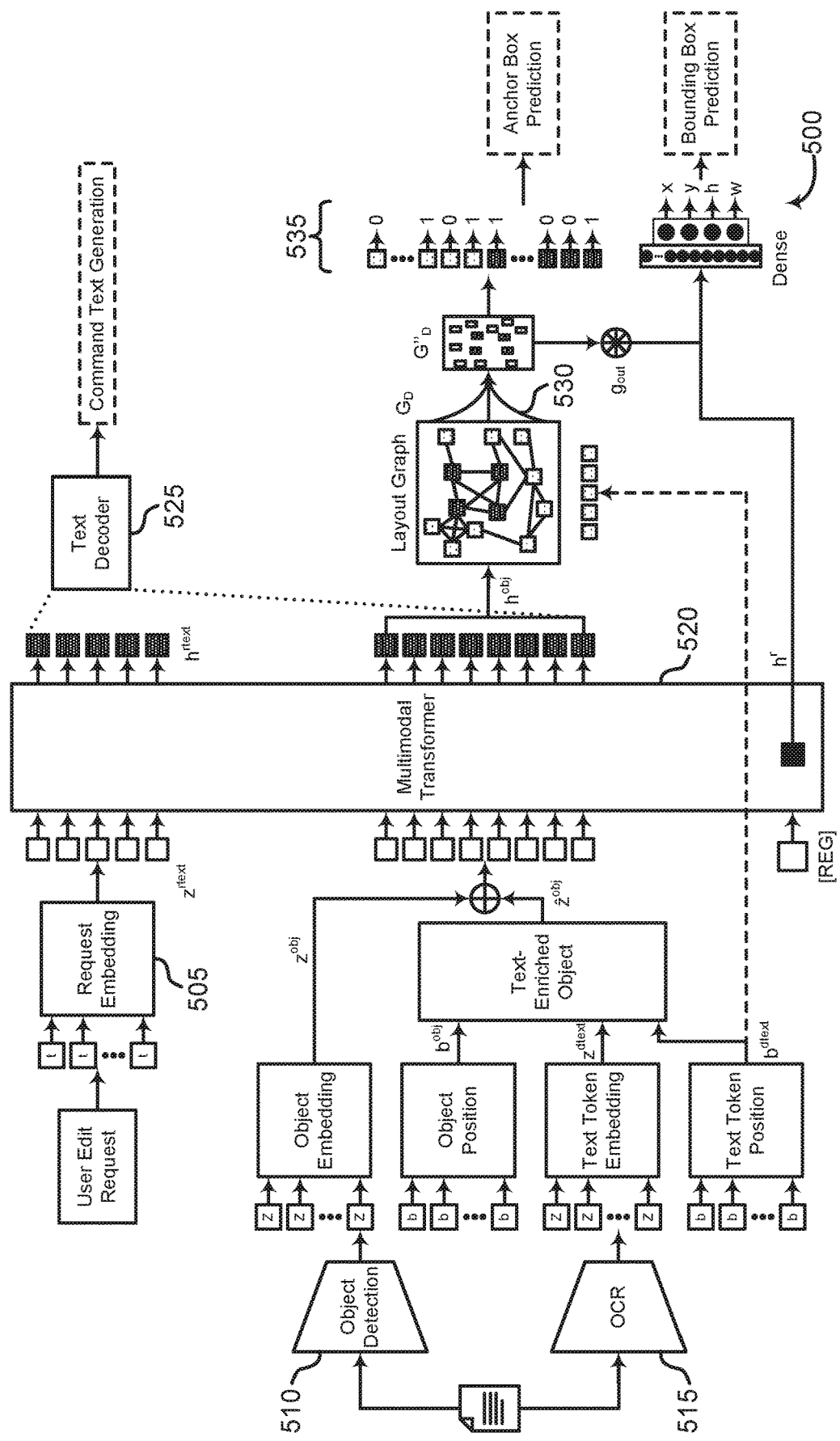
FIG. 5 shows an example of a document editing apparatus according to aspects of the present disclosure.

FIG. 5 shows an example of a document editing apparatus 500 according to aspects of the present disclosure. The document editing apparatus 500 may include a machine learning model that may support language-guided document editing. The machine learning model may include a text encoder 505, an object detection component 510, a character recognition component 515, a multimodal transformer 520, a text decoder 525, a GCN 530, and a location decoder 535.

Object boxes and document text tokens obtained by the object detection component 510 and the character recognition component 515 from the document may be combined using multi-headed attention to form text-enriched visual object embeddings. The text-enriched visual object embeddings are concatenated with the encoded text request and a REG token to form the multimodal input to the multimodal transformer 520. The REG token may be a transformer token that is learned during training and whose state is used for bounding box regression. A text decoder 525 generates command text in an auto-regressive way. The output hidden states of the object boxes and document text token embeddings are used to create a layout graph with nodes joining object boxes and document text boxes. The layout graph may be learned through the GCN 530 (e.g., a gated relational GCN (GR-GCN)). The location decoder 535 may perform node classification for anchor box prediction as an auxiliary task. The graph embedding obtained through a readout function is combined with the REG token embedding to regress the RoI bounding box coordinates.

A machine learning model of the document editing apparatus 500 may receive input from one or more modalities (e.g., a textual request description, visual objects in a document, and text tokens in a document). The model may extract embeddings corresponding to each modality and projects the embeddings into a common d-dimensional latent space.

In the case of a textual request embedding, given the user request, the model may encode the request words $w_1$, $w_2, \ldots, w_i$ into a sequence of T tokens (e.g., WordPiece tokens) using a subword tokenizer and detokenizer (e.g., SentencePiece). For example, the model uses a vocabulary of 32,000 WordPieces obtained from a pre-trained transformer model to convert the tokens into the request text embedding, and then projects the embedding into a d dimensional embedding, yielding $z^{rtext} \in R^{d \times T}$. In the case of a visual object embedding, given a document, the model may use pretrained object detectors to obtain a set of N visual objects in the document. The model extracts the visual object features from the object detector's output. The features are linearly transformed into d-dimensional vector space to get the object embedding as $z^{obj} \in R^{d \times N}$. Further, the model extracts the normalized 2D-bounding box coordinate $b_n^{obj}$ of each object box. In the case of a document text embedding, the model may obtain a set of M document text tokens from the document using an OCR system. For example, the model extracts the 300-dimensional FastText vector, 604-dimensional pyramidal histogram of characters (PHOC) vector, and normalized 2D bounding box coordinates $b_m^{dtext}$. The document editing apparatus 500 may concatenate the features and linearly project the concatenated features into a d-dimensional space to get the final document text embedding as $z^{dtext} \in R^{d \times M}$.

A text-rich document may include multiple document text tokens. As a result, building a common embedding space for user request text, image features, and document text may be challenging. Additionally, the entire set of document text tokens may not fit in the input space due to increasing computational complexity of multi-headed attention that grows quadratically to the input dimension space. In some cases, document text may not contribute equally in grounding edit text in an image. Therefore, it may be appropriate for the document editing apparatus 500 to use the associations between bounding boxes corresponding to document objects (e.g., paragraphs) and nearby document text at a document-level. The associations can be used to handle edit requests that indirectly reference local document objects through the associated document text tokens.

Embodiments of the present disclosure include a text-enriched document object representation component configured to contextually integrate the visual objects with the overlapping document text. In some cases, the integration can be performed by computing the position-guided attention score vector $a_n$ between the $n^{th}$ visual object and m document text tokens for $n=1, \ldots, N$ as follows, $a_n$=softmax$((W^Q b_n^{obj})^T * [W^K b_1^{dtext}, \ldots W^K b_M^{dtext}])$. $W^Q$ and $W^K$ are query projection matrix and key projection matrix, respectively. The document text attended embedding representation for the $n^{th}$ visual object is calculated as the weighted sum of the M document text embeddings given by following equation $z_n^{obj|dtxt}=[z_1^{dtext}, \ldots, z_M^{dtext}]*a_n^T$. Each $n^{th}$ object is then represented by aggregating the object feature embedding $z_n^{obj}$, document text attended object representation $Z_n^{obj|dtext}$, and the linear projection of the object bounding box coordinate $W^{obj} b_n^{obj}$ given as: $\hat{x}_n^{obj}=z_n^{obj}+x_n^{obj|dtext}+W^{obj}b_n^{obj}$. The input sequence of object embeddings is represented by $\hat{z}^{obj}=[\hat{z}_1^{obj}, \ldots, \hat{z}_N^{obj}]$.

The model may fuse the multimodal input context comprising user request embedding $z^{rtext}$ and text-enriched visual object representation $\hat{z}^{obj}$. In some cases, the model pre-appends a learnable embedding to the multimodal input for mapping the spatial location of the edit intent. For example, the learnable embedding can be an [REG] token and is denoted by r. The combined multimodal embedding input for the encoder-decoder model is formulated as $Z^{input}=z^r \oplus \hat{z}^{obj} \oplus r$, where $\oplus$ represents concatenation. The [REG] token is randomly initialized at the beginning of the training stage and optimized with the whole model.

Next, the model utilizes the text-to-text (T5) transformer as the base encoder-decoder architecture to take the input and generate a command sequence. The input and output layers of the model accommodate the additional [REG] token after modification. The multi-head attention mechanism in the transformer model provides for each pair of tokens from the joint embedding to attend to each other across modalities. As a result, the decoder hidden states and the output state of the [REG] token can leverage a consolidated multi-modal representation for localization-aware and layout-oriented command generation and box coordinates regression tasks. The output hidden states from the transformer model can be represented as $h^{out}$=Transformer($z^{input}$) such that $h^{output}=[h_1^{rtext}, \ldots, h_T^{rtext}; h_1^{obj}, \ldots h_N^{obj}; h^r]$, where $h^{rtext}, h^{obj}$, and $h^r$ refer to the output hidden states corresponding to the request text, object embeddings, and [REG] embeddings, respectively. In some cases, the model may perform greedy decoding (e.g., choose the maximum-probability logit at every time step to generate the output command text).

In some cases, user requests may indirectly reference components relative to other neighboring objects or text in the document. The predictive performance of the model can be improved based on the local layout within the RoI. Accordingly, a document layout graph $G_D=(V, E)$ encodes the relative spatial relations between visual object boxes and text positions. Here, $V=\{V^{obj}, V^{dtext}\}$, where $V^{obj}, V^{dtext}$ are the set of nodes corresponding to N object nodes $V_1^{obj}, \ldots, V_N^{obj}$, and M document text token nodes $V_1^{dtext}, \ldots, v_M^{dtext}$, respectively.

The model extracts the node embeddings of object nodes from the output hidden states corresponding to the object boxes $h_n^{obj} \forall n \in \{1, \ldots, N\}$. In the case of document text token nodes, the model directly uses the document text token embedding $z_m^{dtext} \forall m \in \{1, \ldots, M\}$ as the node embedding. The layout graph may include one or more (e.g., three) types of edges E (e.g., object-text token edges, text-text token edges, and object-object box edges). Object-text token edges refer to directed edges for node affiliation if a document text token box lies entirely within an object box. Text-text token edges connect neighboring document text token boxes which leads to dense and isolated components. In some cases, joining adjacent tokens in the same line may produce disconnected components. In some examples, a β-skeleton of document text token boxes in the document with β=1 is provided. In some cases, such edges provide a balance between connectivity within a local cluster of document text tokens and ensure that the graph is one connected component. The graph is constructed on peripheral points of the document text token boxes with a maximum of one edge between each pair of boxes. The connections in the β-skeleton graph are added as undirected edges to the layout graph. Object-object box edges are directed edges weighted by the type of spatial position between two object boxes in the document. In some cases, there may be one or more (e.g., ten) types of spatial relations (e.g., inside, overlap, and 8-way orientations including up, down, left, right, upper-left, upper-right, bottom-left, bottom-right). GR-GCN, a gated variant of a relational GCN (R-GCN), may be used to model the layout graph. GR-GCN can learn highly relational data relationships in densely-connected graph networks. The layout graph is passed through two layers of GR-GCN to obtain enriched graph node embeddings $G''_D$.

In some aspects, the model may directly infer the bounding box coordinates of the RoI over the document. The model aggregates the node embeddings corresponding to object and document text token nodes in $G''_D$ using a summation-based graph readout function which is mathematically denoted as $g_{out}=\rho(\Sigma_{v_i \in G''_D} W_g v_i)$, where $W_g$ is a learnable matrix. The model concatenates the output state of [REG] token from the transformer decoder $h^r$ and the readout output $g^{out}$, and passes the concatenated state through a regression block which is implemented as a multilayer perceptron (MLP) with a rectified linear unit (ReLU) activated fully-connected layer and a prediction head with four outputs for each bounding box coordinate b' as b'=ReLU(Dense(h'⊕$g_{out}$)).

An example embodiment of the present disclosure includes a comparison of the document editing apparatus 500 against multiple unimodal and multi-modal baselines for the command generation task.

In some examples (e.g., Seq2seq text-only examples), GPT2, BART, and T5 may be used as models and the user text description may be taken as input. The GPT2, BART, and T5 models may concatenate the user text description and ground truth command text as input to the transformer model. One or more of the models may perform next token prediction in an autoregressive fashion.

A generator-extractor may use a copy mechanism to extract text from input (e.g., an input user request). The model may additionally extract visual concepts from an object detection model to aid a prediction. The model may be modified to generate an edit command using an edit request (e.g., user edit request input) rather than an utterance history for command generation. For the transformer encoder-decoder, a GPT2 decoder may be combined with a LayoutLMv3 encoder (LayoutLMv3-GPT2) or BERT encoder. A modernized variant may also be experimented with by replacing an LSTM with BERT and Faster-RCNN with DETR.

A transformer encoder-decoder may be implemented using pretrained encoder and decoder transformer layers and combining them to take advantage of cross-domain generalization. Warm starting the model may help to bridge a domain shift. A GPT2 decoder may be combined with a LayoutMv3 encoder and BERT encoder.

For prefix encoding, intermediate learned representations may be used from a pretrained encoder (e.g., CLIP, DiT, and Beit) as a prefix to the GPT2 decoder network and these representations may be finetuned on downstream tasks. Resultant models may be called CLIPClap, DiTClap, and BEiTClap, respectively.

A multimodal transformer may combine multimodal input from a user description, visual objects, and document text with a text generation decoder instead of a copy pointer mechanism. A standard neural architecture popular in scene-text VQA literature may be used. The neural architecture may combine the multimodal input from user description text, a sequence of detected objects, and document text tokens extracted from an OCR system. The output may be processed through a text generation decoder instead of the copy minter mechanism. The transformer may be trained end-to-end on an edit command generation task without pretraining. Thus, the transformer may represent the most naïve transformer benchmark. In some examples, the input document text token sequence may be truncated if it spans beyond a length limit.

For the RoI bounding box prediction task, we compare the document editing apparatus 500 against visual grounding methods.

Two-stage pipeline methods may generate region proposals using pretrained object detectors in a first stage. In a second stage, these methods may leverage language expression to select the best matching region as in CITE and DDPN. CITE and DDPN may be utilized which first generate a set of sparse region proposals and then exploit region-expression matching to find the optimal bounding box.

One-stage approaches may get rid of the computation-intensive object proposal generation and instead may perform dense fusion of linguistic context with the visual features. Visual-linguistic fusion may be performed at intermediate layers of an object detector, and the box with the maximal score over predefined dense anchors may be output. The language-attended feature maps may further be leveraged to perform bounding box prediction in a sliding window manner. In some examples, SSG, ZSGNet, FAOA, or ReSC-Large may be experimented with. SSG and ZSG-Net may be introduced to perform visual-linguistic fusion at intermediate layers of an object detector and output the box with the maximal score over predefined dense anchors. FAOA may encode the text expression into a language vector and fuse the language vector into the YOLOv3 detector to ground the referred instance. ReSC-Large may devise a recursive sub-query construction module to address grounding complex queries.

In some examples, a transformer-based end-to-end model (e.g., TransVG) may perform the multimodal fusion for direct coordinates regression. The model may use an [REG] token to embed the visual-linguistic representation corresponding to performing bounding box regression.

An evaluation may report exact match accuracy (EM %), Word overlap F1, and ROUGE-L. Exact match and word overlap may be very strict measures of the model performance requiring correct identification of every possible token, which is complicated since there may be multiple correct answers, but annotators may select one as the ground truth. To evaluate at a more granular level, the evaluation may compute the accuracy for action, component, attribute, initial state, and final state tokens (e.g., by matching the presence of tokens in ground truth prediction in predicated token sequence).

Bounding box prediction may be evaluated in terms of top-1 accuracy (%) (e.g., if the Jaccard overlap between the predicted region and the ground-truth box is above 0.5, the prediction is regarded correct). Further, a practical system may expect both the command text and the RoI bounding box predictions to be simultaneously correct to perform a user requested edit. Accordingly, a hybrid metric may be used to evaluate a bounding box prediction. For instance, Command Match accuracy (CM %) may be evaluated, and both an exact match of command text and a Jaccard overlap of more than 0.5 between the predicted region and the ground-truth box may be satisfied for a prediction to be regarded as correct.

In some examples, human expert performance may be relied on for evaluation. For instance, a total 100 instances of PDFs and design templates may be sampled, and an expert (e.g., who knows the edit command generation task well) may be asked to predict commands based on a user request and visual context. The human command accuracy may be close to 95%, which shows that there is room for improvement and the dataset and benchmark will provide a challenging task.

An embodiment of the disclosure includes a performance comparison of the document editing apparatus 500 against existing baseline models. In some examples, the performance of the document editing apparatus 500 is compared based on the PDF and design template datasets. The document editing apparatus 500 achieves significantly improved performance across PDF and design template documents when compared to existing text-only and multi-modal baselines used in command generation. In some cases, the document editing apparatus 500 can localize structured components through text-enriched object box embeddings and contextualize relevant visual objects and document text tokens through multi-head attention. Moreover, the document editing apparatus 500 uses the anchor box prediction loss to determine the mutual importance of each object and document text token box which enables improvement in performance over multimodal transformer baseline.

In some examples, the RoI bounding box prediction performance of baseline models is compared with the document editing apparatus 500. As such, scene-text visual grounding baselines are repurposed for a command generation task due to the similarity in the input space. For example, the document editing apparatus 500 outperforms existing baseline models as the model enhances the output of [REG] token embedding using an output from a layout graph.

In some cases, the textual modality of a user request is removed to yield a baseline model. In some cases, removing any model component, i.e., other than textual modality of a user request, may not degrade the performance to below the benchmark value. Thus, the edit command generation task may not be solved without the edit request descriptions. Additionally, removing the layout graph severely degrades bounding box regression performance and text match accuracy because the model loses the ability to spatially localize the relevant objects and document text tokens. In some cases, removing the text-enriched object box embedding significantly affects the consistency of text being generated and the regression box overlap as the model cannot utilize the document text to match the referred component.

According to some embodiments of the present disclosure, the difficulty level of the language-guided document editing task is compared with existing image editing tasks through performance on text generation models. For example, the system can make image modality redundant and trivialize the overall task to seq2seq generation if the text-only modality can provide sufficient information for solving the task. According to some examples, text-only models achieve a high exact match accuracy (approximately 60%). As a result, samples in language-guided image editing datasets include a high degree of generic edit commands that are not user specific and may not require visual or spatial understanding of localized components.

The document editing apparatus 500 achieves high performance across settings against the pairwise combination of strong text generation models (e.g., T5, multimodal transformer) and RoI bounding box regression models (e.g., ReSC-Large and TransVG).

According to an embodiment of the present disclosure, the document editing apparatus 500 generates a command that is consistent with the request by localizing the referred check boxes in the specified column. Additionally, the model can match and ground the document text directly quoted in the description for a deletion command.

Embodiments of the present disclosure include a dataset for language-guided document editing with instances of user edit requests. In some examples, document editing can be performed on PDF s, design templates, and the associated ground truth executable command for real-world document editing automation. One or more embodiments of the present disclosure include a transformer-based localization-aware multimodal model. In some cases, the multimodal model (e.g., DocEditor) may outperform existing baseline models for command generation task and edit RoI prediction tasks.

Document Editing

Figure 6:
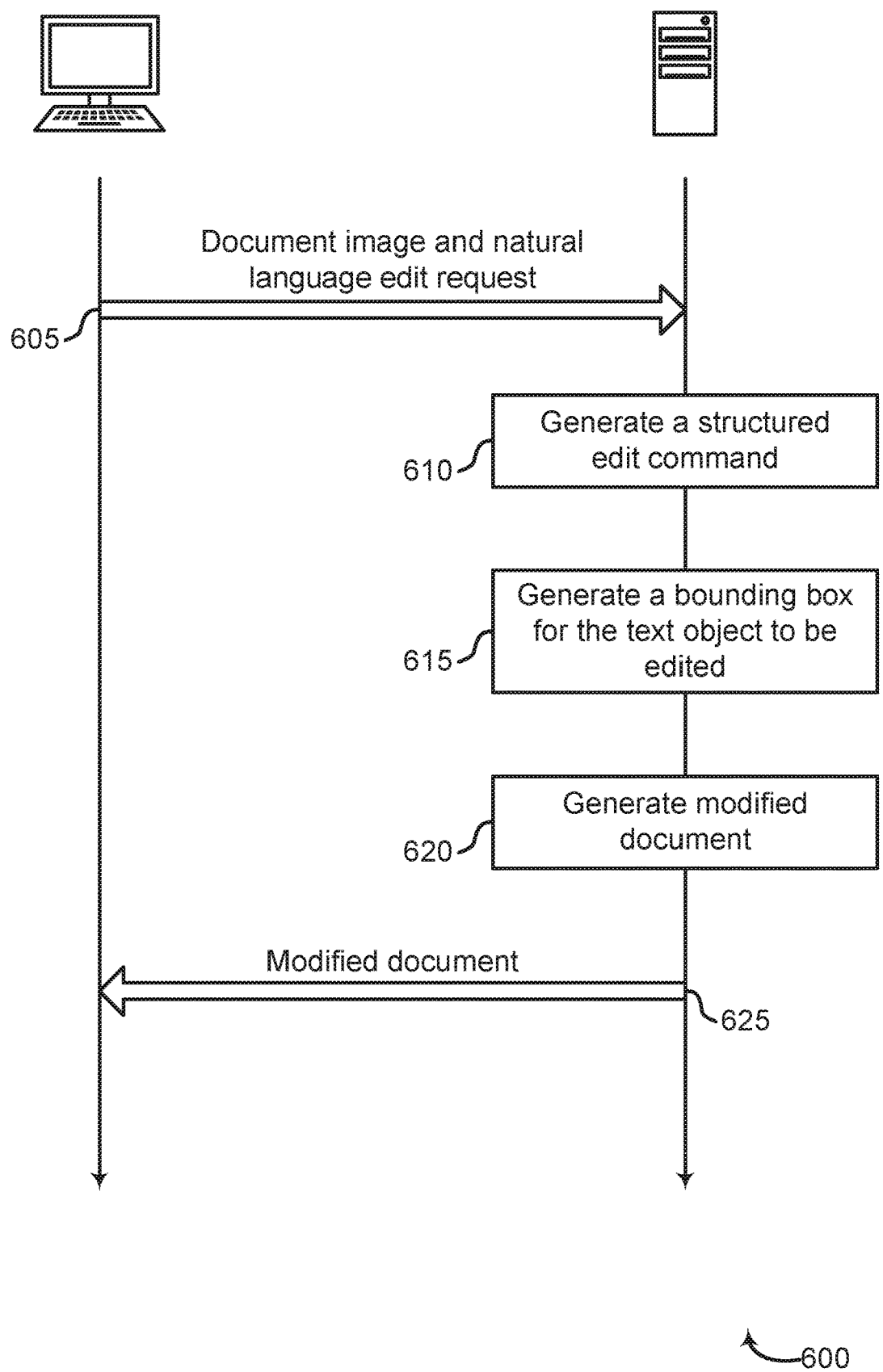
FIG. 6 shows an example of a method for document editing according to aspects of the present disclosure.

FIG. 6 shows an example of method 600 for document editing according to aspects of the present disclosure. In some examples, the described operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various sub steps, or are performed in conjunction with other operations.

At operation 605, a computing device may provide a document and a natural language edit request to a document editing apparatus. The document and the natural language edit request may be for editing the document. The computing device may obtain the document and the natural language edit request from a user. In some cases, the operation of this step refers to, or may be performed by, a computing device as described with reference to FIG. 1 (e.g., based on a user interaction).

At operation 610, a document editing apparatus generates a structured edit command using a machine learning model based on the document and the natural language edit request. The structured edit command may include an action, a target component, an attribute, an initial state, and a final state. In some cases, the operation of this step refers to, or may be performed by, a text encoder, an object detection component, a character recognition component, a multimodal transformer, and a text decoder as described with reference to FIG. 2.

At operation 615, a document editing apparatus generates a bounding box for the text object to be edited. The bounding box may localize edits to be made based on the structured edit command generated at operation 610. In some cases, the operation of this step refers to, or may be performed by, a text encoder, an object detection component, a character recognition component, a multimodal transformer, a graph convolution network, and a location decoder as described with reference to FIG. 2.

At operation 620, a document editing system may generate a modified document based on the document and the structured edit command. The modified document may include a revision of the document that incorporates the natural language edit request. In some cases, the operation of this step refers to, or may be performed by, a document editing apparatus as described with reference to FIG. 2.

At operation 625, a document editing system may provide the modified document to a computing device. In some cases, the operation of this step refers to, or may be performed by, a document editing apparatus as described with reference to FIG. 2.

Figure 7:
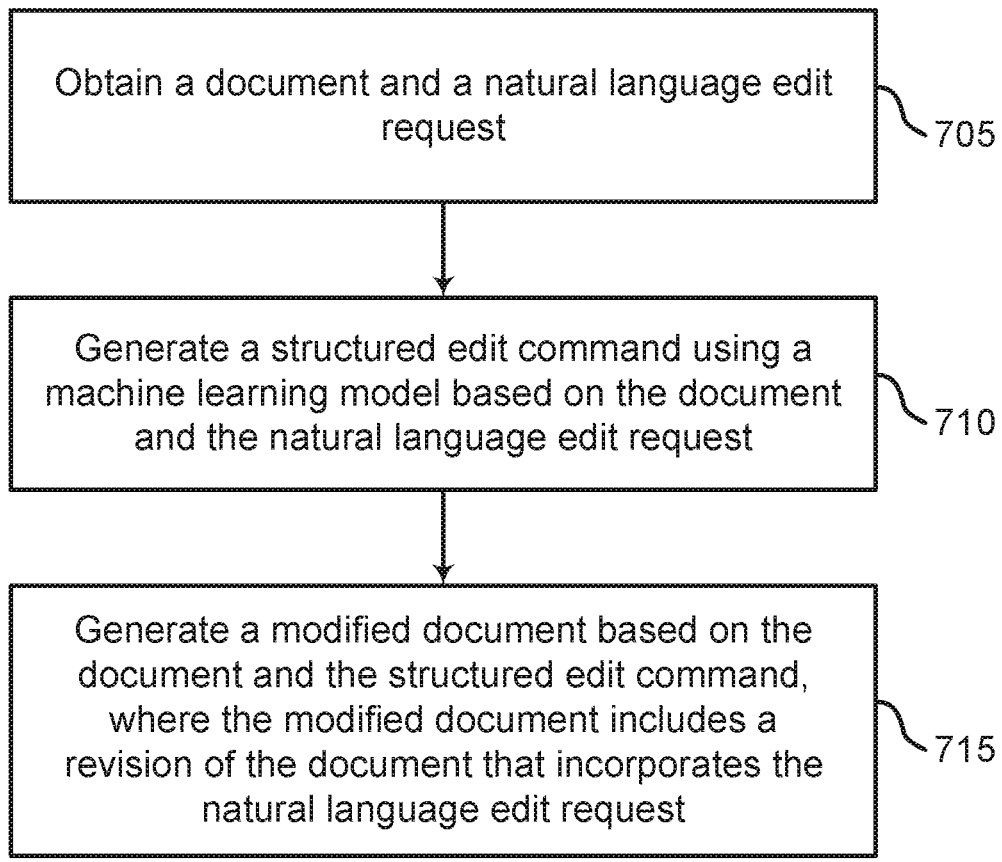
FIGS. 7 through 8 show examples of methods for machine learning according to aspects of the present disclosure.

FIG. 7 shows an example of a method 700 for machine learning according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system obtains a document and a natural language edit request. In some cases, the operations of this step refer to, or may be performed by, a machine learning model as described with reference to FIG. 2.

At operation 710, the system generates a structured edit command using a machine learning model based on the document and the natural language edit request. In some cases, the operations of this step refer to, or may be performed by, a machine learning model as described with reference to FIG. 2.

At operation 715, the system generates a modified document based on the document and the structured edit command, where the modified document includes a revision of the document that incorporates the natural language edit request. In some cases, the operations of this step refer to, or may be performed by, a document editing apparatus as described with reference to FIGS. 1 and 2.

Figure 8:
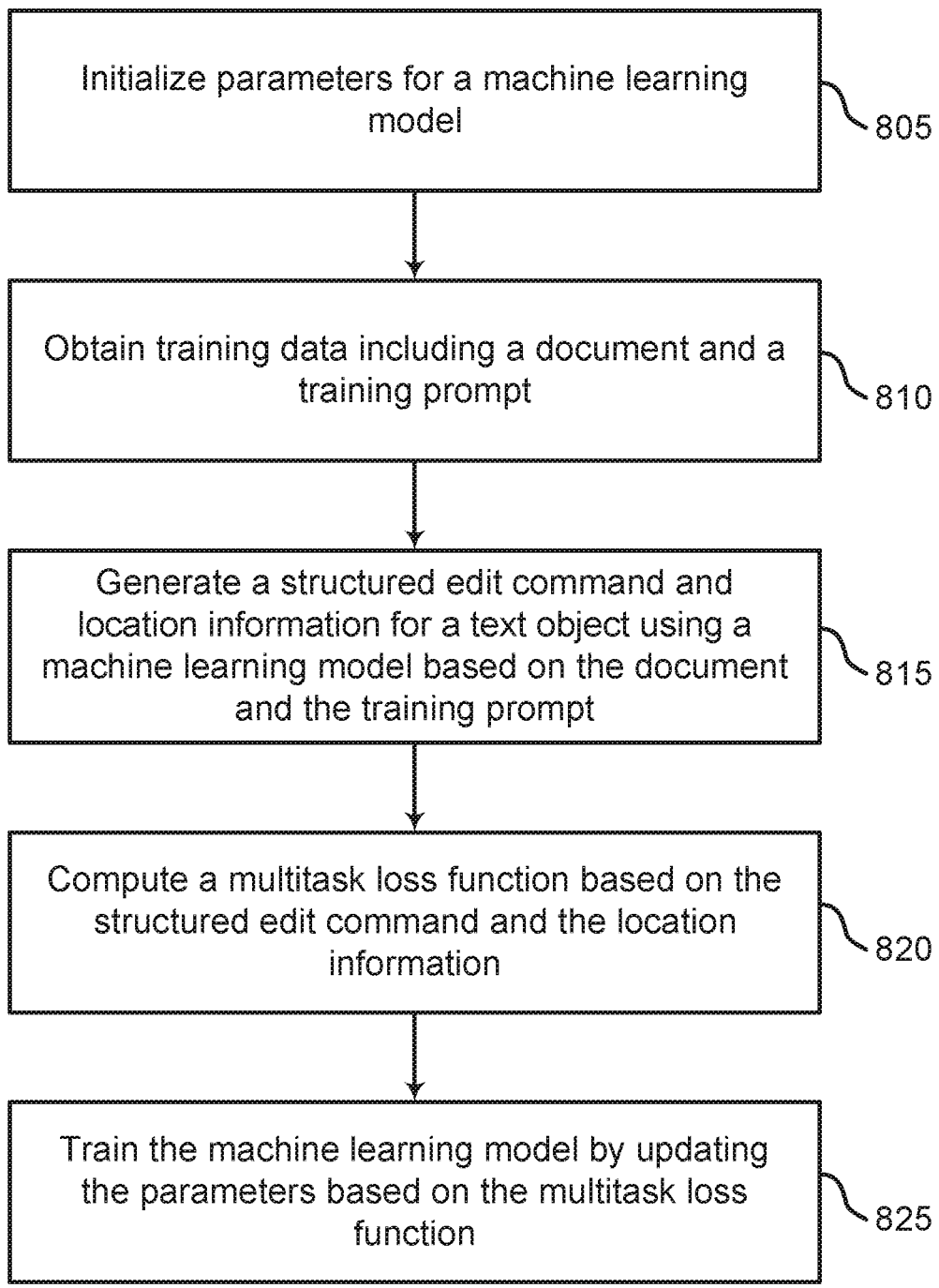

FIG. 8 shows an example of a method 800 for machine learning according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system initializes parameters for a machine learning model. In some cases, the operations of this step refer to, or may be performed by, a training component as described with reference to FIG. 2.

At operation 810, the system obtains training data including a document and a training prompt. In some cases, the operations of this step refer to, or may be performed by, a training component as described with reference to FIG. 2.

At operation 815, the system generates a structured edit command and location information for a text object using a machine learning model based on the document and the training prompt. In some cases, the operations of this step refer to, or may be performed by, a machine learning model as described with reference to FIG. 2.

At operation 820, the system computes a multitask loss function based on the structured edit command and the location information. In some cases, the operations of this step refer to, or may be performed by, a training component as described with reference to FIG. 2.

At operation 825, the system trains the machine learning model by updating the parameters based on the multitask loss function. In some cases, the operations of this step refer to, or may be performed by, a training component as described with reference to FIG. 2.

Training

FIG. 9 shows an example of training data 900 for training a document editing apparatus according to aspects of the present disclosure. A dataset for training the document editing apparatus (e.g., a DocEdit dataset) may provide natural language edit requests on PDFs and design template documents. Each edit request may be mapped to an executable command that can be used to automatically apply edits in a real-world document editing software. The document editing apparatus may be a neural architecture that may generate an executable computer command and ground the RoI bounding box for an edit. In an example 905, an intelligent system may interpret and localize structured components such as subheading, x-axis, sentences and their relative positioning in a document. In an example 910, an intelligent system may match document text tokens in a text-rich document formatted in varied spatial layouts (e.g., check boxes, choice groups, text fields, columns, rows). In an example 915, an intelligent system may visually understand and localize objects as per a description (e.g., in an editing request).

The dataset used for training a document editing apparatus may capture language-guided editing of structured documents such as PDFs, PowerPoint presentations, and design templates, in which the spatial arrangement of content (e.g., text, images, etc.) may be as important as the content itself, and edit operations may be localized to specific regions of a document. Such documents may be rich in layout due to the presence of a high variety of structured components such as tables, graphs, text fields, check boxes, widgets, lists, and backgrounds along with unstructured text. Accordingly, the dataset may provide pairs of a document and a user edit request along with the ground truth edit command and the final edited version of the document. In some examples, there may be two variants of the dataset. A first variant may be a PDF dataset including edits performed on publicly available PDF documents, and a second variant may be a design template dataset including edits on design templates.

For data acquisition, a document editing system may extract 20K anonymized PDF documents from the web with personally identifiable information (PII) removed for the PDF dataset. In addition, the system can download 12K publicly available and freely distributed design templates from one or more platforms for the design template dataset.

For document edit creation, an example embodiment of the present disclosure includes employment of freelance annotators. For example, the employed annotators may have verified past experience in graphic design and Word/PDF document editing. The annotators are provided with examples and online tutorials of editing PDF and design templates. In some cases, the annotators provide creative edit requests unique to each document. The edit requests are shuffled and each annotator is asked to utilize one or more tools for physically editing PDF documents and design templates. Two sets of annotators are trained to increase familiarity with the edit creation process to guarantee the quality of the dataset. The annotators are provided feedback for 100 practice edit requests and the corresponding edited version of the document during the training session. The training session is performed multiple times until the quality of the data has no obvious or critical issues.

For ground truth collection, the system develops a taxonomy of possible actions, components, and attributes. The annotators are asked to select the most relevant edit action and one or more relevant options for components and attributes. Additionally, the annotators provide ground truth labels for initial state of the component prior to editing and the final state of the component post editing. In some cases, the final state post editing is provided as text inputs filled by the annotator based on the user request description and visual context from the document. The annotators mark an enclosed bounding box region surrounding the corresponding component in the document to uniquely identify the location of the component to be edited. The system concatenates the labels and bounding box coordinate to form the output command. Ground truth labels may not be sourced from the same annotator providing the edit request description.

TABLE 1

Inter-annotator agreement for the PDF dataset and the design template dataset

| Feature | PDF Dataset | Design Template Dataset |
| --- | --- | --- |
| Action | 0.79 | 0.74 |
| Components | 0.67 | 0.64 |
| Attributes | 0.65 | 0.67 |
| Initial State | 0.61 | 0.59 |
| Final State | 0.60 | 0.61 |

Table 1 shows the inter-annotator agreement metrics for the test portion (e.g., 20% of the dataset) that is annotated twice. For instance, Table 1 reports the highest agreement on actions and bounding boxes, followed by components, attributes, initial states, and final states. Krippendorff's alpha is provided for action, attribute and component labels, initial and final state. A high degree of agreement between annotators is achieved.

In some examples, 28.3K document edit pairs are collected and divided between 17.8K PDFs and 10.5K design templates. An average length of user descriptions and output command may be 12.6 and 8.5 words, respectively. Documents may be textually dense with an average of 122 OCR'ed words.

In some cases, the system categorizes edit requests as direct, object-referencing, or text-referencing requests. Direct requests are self-contained with specific cues about the component to be modified. For example, approximately 75.6% of samples in the training dataset are indirect requests that refer to a component or text in document through the relative position. As a result, the task of generating an edit command may be challenging since a system may be expected to resolve indirect object references.

In some examples, the system splits the PDF dataset and the design template dataset into train, validation, and test sets in the ratio of 70:10:20.

Figure 10:
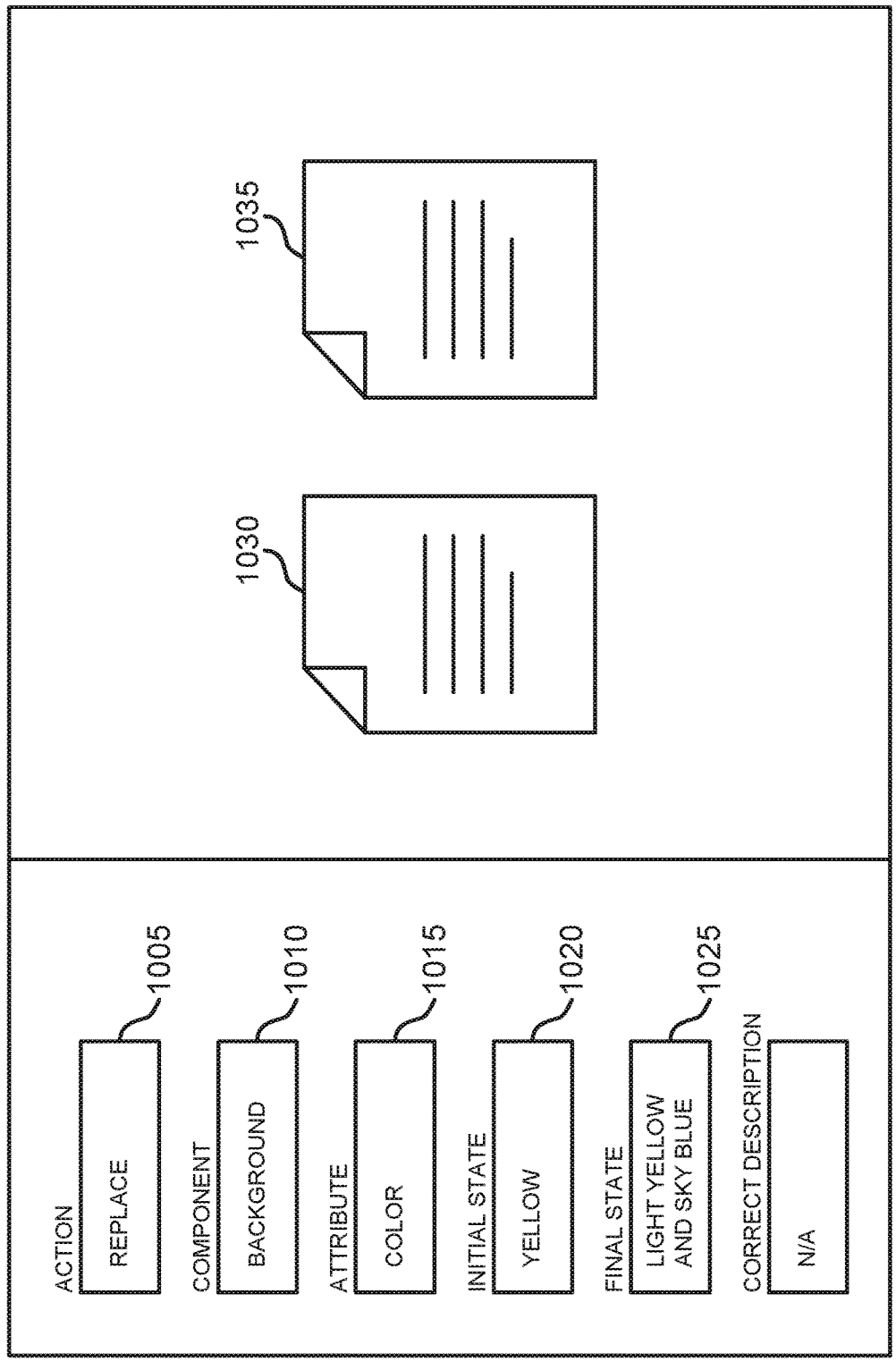
FIG. 10 shows an example a user interface (UE) for data annotation according to aspects of the present disclosure.

FIG. 10 shows an example of a UI 1000 for data annotation according to aspects of the present disclosure. The annotation interface may show the labeling of a design template document for an action 1005, component 1010, attribute 1015, initial state 1020, and final state 1025. An annotator may have access to an original document 1030 and a modified document 1035 along with a user edit description. In some examples, the annotator may label an RoI in the original document 1030 or the modified document 1035.

In some cases, a document can be edited to change relative ordering of text paragraphs; change ordering of lines, text boxes, check boxes, tables, headers; swap text and images; resizing aspect ratios; change background, foreground; swap image with text; color scheme changes; orientation changes; modify check boxes and replace with empty blanks box; break items stacked below each other into different columns; add empty blanks in a form where answers can be typed; add a watermark on the document; align components relative to each other; highlight text using the highlight tool.

Annotators may provide a written description that describes an edit request for a document. The written description may be clear and understandable in English such that another person can exactly duplicate an edit by reading the description. For example, the description may include an intent that refers to an action performed on the document in layman's language. Additionally, annotators may identify the type of the component(s) that changed in a document. A visual difference refers to a difference between how a component will look compared to how the component looked before an edit. In some cases, the type or textual description of nearby components in a document is used to identify a relative location of an edited component. In some cases, annotators may identify the number of components of each type that are edited.

Based on a document and a user description, an annotator may perform an edit mentioned in a user request by digitally editing a document. One or more software tools may be used for the editing task. After the edit, the document may remain aesthetically pleasing. In some cases, annotators may perform ground truth collection. Ground truth collection may include an original document page, an edited version of the document page, and a short text description of the performed edit. Based on a collection, annotators may answer questions related to an edit action performed, a component modified in the original document, or an attribute, initial state, and final state of the modified component. Further, the annotators may add a rectangular bounding box using an interface enclosing a component edited in a file.

According to an embodiment, annotators may be selected from a pool of interested freelance designers or document editors. The annotators may pass a qualification task, undergo training of the task (e.g., training for generating edit commands), and may be provided instructional training to increase familiarity with the task. Once the annotators understand the task and perform above a set threshold on sample document-edit pairs, an induction process may begin.

In some cases, the annotators may be hired after passing a qualification task. The annotators may be informed of the task, the cost, number of hours expected, and the purpose of the annotation. Ethical standards of working with crowd workers or freelancers may be followed. The annotators may be onboarded to an annotation project after obtaining written consent and signing a formal annotation contract agreement. The annotators may be paid for the training time.

In some examples, the hired annotators may span one or more (e.g., 5) different countries (e.g., including the United States, Turkey, Philippines, India, Pakistan, and Bangladesh). The annotators may be fluent in spoken and written English and may have prior designing or editing experience.

In some examples, a collaborative data training platform such as Labelbox may collect a ground truth command corresponding to each edit in a dataset.

Once the dataset for training a document editing apparatus is collected, the document editing apparatus may be trained based on a multitask loss function. During training, a document editing system may generate a structured edit command and location information for a text object based on a document and a training prompt, and the document editing system may compute a multitask loss function based on a generated structured edit command and location information. The document editing system may then train a machine learning model by updating parameters for the machine learning model based on the multitask loss function. The multitask loss function may include a command generation loss, a bounding box regression loss, and a location prediction loss (e.g., an anchor box prediction loss).

The command generation loss may be based on the structured edit command generated by the document editing apparatus (e.g., the textual part of the desired output command). The pre-trained weights of T5 may be used for generating the textual part of the desired output command. The pre-trained weights of T5 may be obtained by performing a denoising pre-training task on 750 GB cleaned English text data from a publicly-available common crawl web archive. The system finetunes the backbone transformer architecture using standard maximum likelihood, i.e., using teacher forcing and a cross-entropy loss between predicted token $t'_i$ and ground truth token $t_i$ as $L_{gen}=-\Sigma_i t_i \log t'_i$, where $t_i=1$ for a token predicted correctly.

The bounding box regression loss may be based on a bounding box predicted by the document editing apparatus. The system predicts normalized bounding box coordinates between 0 and 1000 to reduce scaling effects due to varying sizes of the predicted boxes. In some cases, the bounding boxes are scaled by the document dimensions to retrieve original dimensions. In some examples, a weighted sum of the scale invariant generalized IoU loss (GIoU) and the smooth L1 loss are used for standard regression problem. Let b=(x, y, w, h) denote the prediction of the normalized ground-truth box as b'=(x', y',w', h'). The training objective of the bounding box regression is: $L_{bbox}=L_{smooth-l1}(b, b')+\lambda L_{giou}(b, b')$ where $L_{smooth-l1}$ and $L_{giou}$ are the smooth L1 loss and GIoU loss, respectively. $\lambda$ is a hyperparameter.

The location prediction loss (e.g., anchor box prediction loss) may be based on a location for an edit predicted by the document editing apparatus. The model can select one object or document text token boxes that have high overlap with the ground truth RoI. Each node in the layout graph is treated as an anchor. Binary node classification is performed to predict if the object or document text token box lies entirely within the ground truth region of interest (RoI). The model optimizes the anchor prediction as an auxiliary task through the binary cross-entropy loss as: $L_{anchor}=-\Sigma_{v \in G''_D} y_i \log V_i$, where $y_i=1$ if the object box overlaps with RoI, else 0.

Command generation, bounding box regression, and location (e.g., anchor box) prediction tasks share a common linguistic, spatial and visual latent space, and can reinforce each other. As a result, the tasks are correlated and multi-task training is used to optimize both tasks simultaneously. The final optimization uses a weighted sum of $L_{gen}$, $L_{reg}$, $L_{anchor}$ such that total loss $L=\lambda_1 L_{gen}+\lambda_2 L_{reg}+(1-\lambda_1-\lambda_2)L_{anchor}$, where the weighting factors $\lambda_1$, $\lambda_2$ are hyperparameters.

According to an embodiment of the present disclosure, a pretrained document image transformer (DiT) detects visual objects in the PDF dataset. In the design template dataset, a transformer-based end-to-end object detector (DETR) is used in addition to DiT. The combination detects visually rich natural images in design templates which are intricately spatially wrapped together with document text. In some cases, a Tesseract OCR engine (PyTesseract3 OCR) extracts document text.

According to an embodiment of the present disclosure, a transformer T5 architecture modifies input and output layers to accommodate an additional [REG] token with a text generation decoder. For example, the encoder and decoder consist of 12 blocks, i.e., each block comprising self-attention, optional encoder-decoder attention, and a feed-forward network. In some examples, the feed-forward networks in each block consist of a dense layer with an output dimensionality of 3072 followed by a ReLU non-linearity and another dense layer. The "key" and "value" matrices of the attention mechanisms have an inner dimensionality of 64 and include 12 heads.

In some examples, the remaining sub-layers and embeddings have a dimensionality of 768 which results in a model with approximately 220 million parameters. The T5 architecture is pre-trained on 750 GB cleaned English webtext corpora, e.g., Colossal Clean Crawled Corpus with a denoising task, which is a variant of masked language modeling (MLM). In some examples, the T5 architecture uses the weights from T5 model transformer, HuggingFace. A document editing apparatus is trained end to end using cross entropy loss for command text generation, a combination of L1 and GIoU loss for bounding box prediction, and cross entropy loss for anchor box prediction. In some examples, the models are trained for 100K steps and use an AdamW optimizer set with default values $\beta 1=0.9$, $\beta 2=0.999$, $\epsilon=1e-8$, weight-decay of 5e-4. A warm-up period may be set to 1,000 steps and may be linearly decayed to zero.

The model's total parameters may be asymptotically close to the T5 Transformer used as backbone. For example, a document editing apparatus includes approximately 2.5 million parameters and the T5 model includes approximately 2.2 million parameters. Accordingly, the document editing apparatus may not add significantly more parameters than the Transformer backbone.

According to an embodiment of the present disclosure, a range of hyper parameters may be provided for a document editing apparatus. For example, the document editing apparatus's hyper parameters may be given as: a size of hidden layers in fully connected layers {128, 256, 512}, a size of hidden layers in GCN {128, 256, 512}, an input projected embedding size {512, 768, 256}, an output projected embedding size {512, 768, 256}, a dropout $\delta \in \{0.1, 0.2, 0.3, 0.4, 0.5.0.6\}$, a learning rate $\lambda \in \{1e-5, 2e-5, 3e-5, 4e-5, 5e-5\}$, a weight decay $\omega \in \{1e-6, 1e-5, 1e-4, 1e-3\}$, a batch size $b \in \{2, 4, 8, 16\}$, and a number of epochs ($\leq 25$). The input embeddings may be projected with d=768. The fully-connected layers may use a hidden dimension of 512, a dropout $\delta=0.4$, and a learning rate (lr) of 1e-3 for regression, 1e-4 for command generation, and 2e-5 for node classification.

Hyper-parameters for the document editing apparatus may be tuned on a respective validation set to find appropriate configurations for different datasets. A grid search is performed to select the set of training configurations across each dataset. The document editing apparatus may optimize the loss function and scores across epochs may be saved on the basis of exact match evaluation metric for command text generation and top-1 accuracy for RoI region prediction. In some examples, 5 rounds of hyper-parameter search trials may be run and an average of observed results may be provided. Table 2 lists potential values of the hyperparameters used in a document editing apparatus.

TABLE 2

Training hyperparameters of a document editing apparatus for a PDF dataset and a design template dataset

| Hyperparameters | PDF Dataset | Design Template Dataset |
|---|---|---|
| Dropout Ratio | 0.4 | 0.4 |
| Optimizer | Adam | Adam |
| RGCN Layers | 2 | 2 |
| Input token length | 512 | 512 |
| Input Projected Dimension | 768 | 768 |
| Output Dimension (T5) | 768 | 768 |
| Hidden Dimension (RGCN) | 256 | 256 |
| Hidden Dimension (Dense) | 256 | 256 |
| Epochs | 20 | 20 |
| Batch Size | 4 | 4 |
| Learning Rate (Command Text Generation) | 1e-4 | 1e-4 |
| Learning Rate (Bounding Box Regression) | 1e-3 | 1e-3 |
| Learning Rate (Anchor Box Prediction) | 2e-5 | 2e-5 |
| $\lambda$ | 0.6 | 0.4 |
| $\lambda_1$ | 0.5 | 0.5 |

TABLE 2-continued

Training hyperparameters of a document editing apparatus
for a PDF dataset and a design template dataset

| Hyperparameters | Dataset | |
| --- | --- | --- |
| | PDF Dataset | Design Template Dataset |
| $\lambda_1$ | 0.25 | 0.25 |
| $\lambda_3$ | 0.25 | 0.25 |
| Activation Function of Linear layers | ReLU | ReLU |
| Output Classes (Node Classification) | 2 | 2 |

Figure 11:
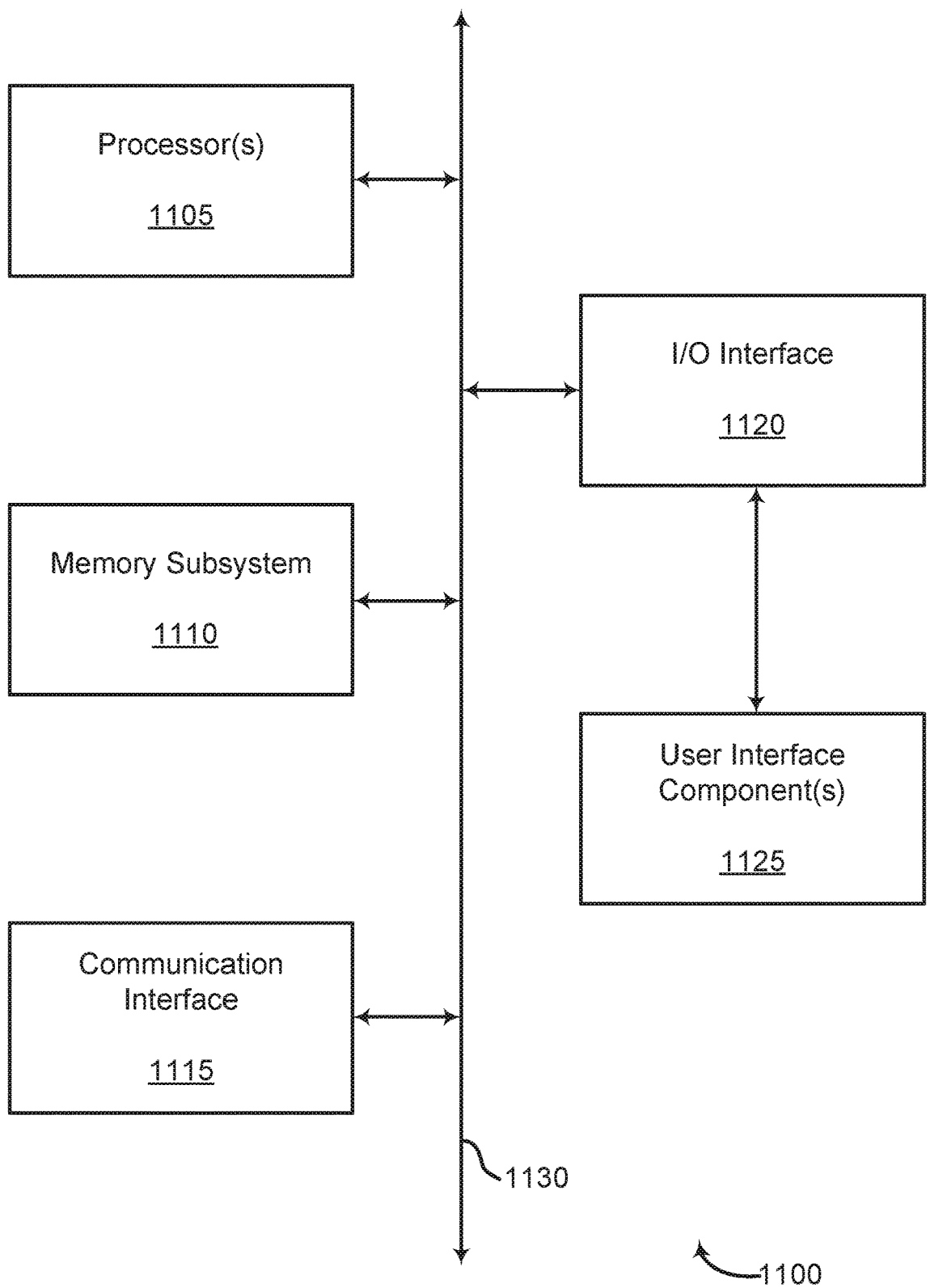
FIG. 11 shows an example of a computing device for document editing according to aspects of the present disclosure.

FIG. 11 shows an example of a computing device for document editing according to aspects of the present disclosure. In one aspect, computing device 1100 includes processor(s) 1105, memory subsystem 1110, communication interface 1115, I/O interface 1120, user interface component(s) 1125, and channel 1130.

In some embodiments, computing device 1100 is an example of, or includes aspects of, document editing apparatus 200 of FIG. 2. In some embodiments, computing device 1100 includes one or more processors 1105 that can execute instructions stored in memory subsystem 1110 for obtaining a document and a natural language edit request; generating a structured edit command using a machine learning model based on the document and the natural language edit request; and generating a modified document based on the document and the structured edit command, where the modified document includes a revision of the document that incorporates the natural language edit request.

According to some aspects, computing device 1100 includes one or more processors 1105. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1110 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1115 operates at a boundary between communicating entities (such as computing device 1100, one or more user devices, a cloud, and one or more databases) and channel 1130 and can record and process communications. In some cases, communication interface 1115 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1120 is controlled by an I/O controller to manage input and output signals for computing device 1100. In some cases, I/O interface 1120 manages peripherals not integrated into computing device 1100. In some cases, I/O interface 1120 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1120 or via hardware components controlled by the I/O controller.

According to some aspects, user interface component(s) 1125 enable a user to interact with computing device 1100. In some cases, user interface component(s) 1125 include an audio device, such as an external speaker system, an external display device such as a display screen, an input device (e.g., a remote-control device interfaced with a user interface directly or through the I/O controller), or a combination thereof. In some cases, user interface component(s) 1125 include a GUI.

Accordingly, the present disclosure includes the following aspects.

A method for machine learning for document editing is described. One or more aspects of the method include obtaining a document and a natural language edit request; generating a structured edit command using a machine learning model based on the document and the natural language edit request; and generating a modified document based on the document and the structured edit command, wherein the modified document comprises a revision of the document that incorporates the natural language edit request.

Some examples of the method, apparatus, non-transitory computer readable medium, and system further include encoding the natural language edit request to obtain a request embedding, wherein the structured edit command is generated based on the request embedding.

Some examples of the method, apparatus, non-transitory computer readable medium, and system further include performing object detection on the document to obtain a text object. Some examples further include performing text recognition on the document to obtain a text embedding. Some examples further include combining the text object with the text embedding to obtain a text-enriched object, wherein the structured edit command is generated based on the text-enriched object.

Some examples of the method, apparatus, non-transitory computer readable medium, and system further include identifying an object position for the text object. Some examples further include identifying a text position of the text embedding, wherein the text object with the text embedding are combined based on the object position and the text position.

Some examples of the method, apparatus, non-transitory computer readable medium, and system further include generating a hidden text representation using the machine learning model. Some examples further include decoding the hidden text representation to obtain the structured edit command.

In some aspects, the structured edit command includes an action, a target component, an attribute, an initial state, and a final state.

Some examples of the method, apparatus, non-transitory computer readable medium, and system further include generating a hidden object representation of a text object. Some examples further include generating a layout graph based on the document. Some examples further include generating a modified object representation based on the hidden object representation and the layout graph. Some examples further include generating location information of the text object based on the modified object representation, wherein the modified document is generated based on the location information of the text object.

In some aspects, the location information comprises a bounding box for the text object.

Some examples of the method, apparatus, non-transitory computer readable medium, and system further include generating a REG token. Some examples further include generating an REG representation based on the REG token using the machine learning model, wherein the location information is generated based on the REG representation.

Some examples of the method, apparatus, non-transitory computer readable medium, and system further include generating a document image based on the document, where the document image does not include parsed text data, and where the structured edit command and the modified document are generated based on the document image.

A method for machine learning for document editing is described. One or more aspects of the method include initializing parameters for a machine learning model; obtaining training data including a document and a training prompt; generating a structured edit command and location information for a text object using a machine learning model based on the document and the training prompt; computing a multitask loss function based at least in part on the structured edit command and the location information; and training the machine learning model by updating the parameters based on the multitask loss function.

Some examples of the method, apparatus, non-transitory computer readable medium, and system further include computing a command generation loss based on the structured edit command, wherein the multitask loss function includes the command generation loss.

Some examples of the method, apparatus, non-transitory computer readable medium, and system further include computing a bounding box regression loss based on the location information, wherein the multitask loss function includes the bounding box regression loss.

Some examples of the method, apparatus, non-transitory computer readable medium, and system further include computing a location prediction loss that indicates whether the location information lies within a ground truth region of interest (RoI), wherein the multitask loss function includes the location prediction loss.

A system for machine learning for document editing is described. One or more aspects of the system include a memory component; and a processing device coupled to the memory component, the processing device to perform operations comprising: obtaining a document and a natural language edit request; generating a structured edit command using a machine learning model based on the document and the natural language edit request; and generating a modified document based on the document and the structured edit command, wherein the modified document comprises a revision of the document that incorporates the natural language edit request.

In some aspects, the machine learning model comprises a multimodal transformer.

In some aspects, the machine learning model includes a text encoder configured to encode the natural language edit request to obtain a request embedding, wherein the structured edit command is generated based on the request embedding.

In some aspects, the machine learning model includes an object detection component and a character recognition component.

In some aspects, the machine learning model includes a text decoder, wherein the structured edit command is output by the text decoder.

In some aspects, the machine learning model includes a graph convolution network and a location decoder that takes an output of the graph convolution network, wherein the location decoder outputs location information for editing the document.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining a document and a natural language edit request;
generating a structured edit command using a machine learning model based on the document and the natural language edit request by performing object detection on the document to obtain a text object, performing text recognition on the document to obtain a text embedding; and combining the text object with the text embedding to obtain a text-enriched object, wherein the structured edit command is generated based on the text-enriched object; and
generating a modified document based on the document and the structured edit command, wherein the modified document comprises a revision of the document that incorporates the natural language edit request.

2. The method of claim 1, further comprising:
encoding the natural language edit request to obtain a request embedding, wherein the structured edit command is generated based on the request embedding.

3. The method of claim 1, further comprising:
identifying an object position for the text object; and
identifying a text position of the text embedding, wherein the text object with the text embedding are combined based on the object position and the text position.

4. The method of claim 1, further comprising:
generating a hidden text representation using the machine learning model; and
decoding the hidden text representation to obtain the structured edit command.

5. The method of claim 1, wherein:
the structured edit command includes an action, a target component, an attribute, an initial state, and a final state.

6. The method of claim 1, further comprising:
generating a hidden object representation of a text object;
generating a layout graph based on the document;
generating a modified object representation based on the hidden object representation and the layout graph; and
generating location information of the text object based on the modified object representation, wherein the modified document is generated based on the location information of the text object.

7. The method of claim 6, wherein:
the location information comprises a bounding box for the text object.

8. The method of claim 7, further comprising:
generating a regression (REG) token;
generating an REG representation based on the REG token using the machine learning model, wherein the location information is generated based on the REG representation.

9. The method of claim 1, further comprising:
generating a document image based on the document, wherein the document image does not include parsed text data, and wherein the structured edit command and the modified document are generated based on the document image.

10. A system comprising:
a memory component; and
a processing device coupled to the memory component, the processing device to perform operations comprising:
obtaining a document and a natural language edit request;
generating a structured edit command using a machine learning model based on the document and the natural language edit request by generating a hidden text representation using the machine learning model and decoding the hidden text representation to obtain the structured edit command; and
generating a modified document based on the document and the structured edit command, wherein the modified document comprises a revision of the document that incorporates the natural language edit request.

11. The system of claim 10, wherein:
the machine learning model comprises a multimodal transformer.

12. The system of claim 10, wherein:
the machine learning model includes a text encoder configured to encode the natural language edit request to obtain a request embedding, wherein the structured edit command is generated based on the request embedding.

13. The system of claim 10, wherein:
the machine learning model includes an object detection component and a character recognition component.

14. The system of claim 10, wherein:
the machine learning model includes a text decoder, wherein the structured edit command is output by the text decoder.

15. The system of claim 10, wherein:
the machine learning model includes a graph convolution network and a location decoder that takes an output of the graph convolution network, wherein the location decoder outputs location information for editing the document.

16. A non-transitory computer readable medium storing code for natural language editing, the code comprising instructions executable by at least one processor to:
obtain a document and a natural language edit request;
generate a structured edit command using a machine learning model based on the document and the natural language edit request;
generating a hidden object representation of a text object;
generating a layout graph based on the document;

generating a modified object representation based on the hidden object representation and the layout graph;

generating location information of the text object based on the modified object representation; and generate a modified document based on the document, the location information of the text object, and the structured edit command, wherein the modified document comprises a revision of the document that incorporates the natural language edit request.

17. The non-transitory computer readable medium of claim 16, the code further comprising instructions executable by the at least one processor to:

encode the natural language edit request to obtain a request embedding, wherein the structured edit command is generated based on the request embedding.

18. The non-transitory computer readable medium of claim 16, the code further comprising instructions executable by the at least one processor to:

perform object detection on the document to obtain a text object;

perform text recognition on the document to obtain a text embedding; and combine the text object with the text embedding to obtain a text-enriched object, wherein the structured edit command is generated based on the text-enriched object.

19. The non-transitory computer readable medium of claim 18, the code further comprising instructions executable by the at least one processor to:

identify an object position for the text object; and identify a text position of the text embedding, wherein the text object with the text embedding are combined based on the object position and the text position.

* * * * *